US008701799B2

(12) United States Patent
Hall et al.

(10) Patent No.: US 8,701,799 B2
(45) Date of Patent: Apr. 22, 2014

(54) DRILL BIT CUTTER POCKET RESTITUTION

(75) Inventors: David R. Hall, Provo, UT (US); Francis Leany, Salem, UT (US)

(73) Assignee: Schlumberger Technology Corporation, Houston, TX (US)

( * ) Notice: Subject to any disclaimer, the term of this patent is extended or adjusted under 35 U.S.C. 154(b) by 833 days.

(21) Appl. No.: 12/432,109

(22) Filed: Apr. 29, 2009

(65) Prior Publication Data

US 2010/0275425 A1   Nov. 4, 2010

(51) Int. Cl.
*E21B 10/62* (2006.01)
*B23P 6/00* (2006.01)

(52) U.S. Cl.
USPC ..... 175/435; 175/432; 29/402.07; 29/402.18; 299/113

(58) Field of Classification Search
USPC ............. 175/432, 435, 412, 413; 76/108.1, 76/108.2, 108.4; 299/113; 407/33, 46, 47, 407/101, 102; 29/402.07, 402.13, 402.16, 29/402.18
See application file for complete search history.

(56) References Cited

U.S. PATENT DOCUMENTS

| | | |
|---|---|---|
| 465,103 A | 12/1891 | Wegner |
| 590,113 A | 9/1897 | Prindle |
| 616,118 A | 12/1898 | Kunhe |
| 946,060 A | 1/1910 | Looker |
| 1,116,154 A | 11/1914 | Stowers |
| 1,183,630 A | 5/1916 | Bryson |
| 1,189,560 A | 7/1916 | Gondos |
| 1,360,908 A | 11/1920 | Everson |
| 1,372,257 A | 3/1921 | Swisher |
| 1,387,733 A | 8/1921 | Midgett |
| 1,460,671 A | 7/1923 | Hebsacker |
| 1,544,757 A | 7/1925 | Hufford et al. |
| 1,746,455 A | 2/1930 | Woodruff |
| 1,821,474 A | 9/1931 | Mercer |
| 1,836,638 A | 12/1931 | Bonney |
| 1,879,177 A | 9/1932 | Gault |
| 1,899,343 A | 2/1933 | William |
| 2,004,315 A | 6/1935 | Fean |
| 2,022,101 A | 11/1935 | Wright |
| 2,040,263 A | 5/1936 | Layne et al. |

(Continued)

FOREIGN PATENT DOCUMENTS

| | | |
|---|---|---|
| DE | 3307910 A1 | 9/1984 |
| DE | 3431495 A1 | 3/1986 |

(Continued)

OTHER PUBLICATIONS

Chaturvedi et al., Diffusion Brazing of Cast Inconel 738 Superalloy, Sep. 2005, Journal of Materials Online (http://www.azom.com/details.asp?ArticleID=2995).

(Continued)

*Primary Examiner* — Kenneth L Thompson
(74) *Attorney, Agent, or Firm* — Osha Liang LLP

(57) ABSTRACT

A pocket restitution assembly comprises a pocket formed in a surface that includes a central axis, an anchor seated in the pocket and aligned with the central axis, a tool attachment comprising an end for connection to the anchor, and a hollow bit slidably and rotatably sitting on the tool attachment. The hollow bit may fit within the pocket. Weld material may be deposited within the pocket to form an interior of the pocket. The weld material may be shaped by the hollow bit to accept a cutting element.

18 Claims, 11 Drawing Sheets

(56) References Cited

U.S. PATENT DOCUMENTS

| | | |
|---|---|---|
| 2,054,255 A | 9/1936 | Howard |
| 2,064,255 A | 12/1936 | Garfield |
| 2,124,438 A | 7/1938 | Struk |
| 2,169,223 A | 8/1939 | Christian |
| 2,199,692 A | 5/1940 | Catland |
| 2,218,130 A | 10/1940 | Court |
| 2,227,233 A | 12/1940 | Scott et al. |
| 2,247,499 A | 7/1941 | Hutchison |
| 2,320,136 A | 5/1943 | Kammerer |
| 2,345,024 A | 3/1944 | Bannister |
| 2,371,248 A | 3/1945 | McNamara |
| 2,375,335 A | 5/1945 | Walker |
| 2,466,991 A | 4/1949 | Kammerer |
| 2,540,464 A | 2/1951 | Stokes |
| 2,544,036 A | 3/1951 | Kammerer |
| 2,545,036 A | 3/1951 | Kammerer |
| 2,575,173 A | 11/1951 | Johnson |
| 2,619,325 A | 11/1952 | Arutunoff |
| 2,626,780 A | 1/1953 | Ortloff |
| 2,643,860 A | 6/1953 | Koch |
| 2,725,215 A | 11/1955 | Macneir |
| 2,746,721 A | 5/1956 | Moore |
| 2,755,071 A | 7/1956 | Kammerer |
| 2,776,819 A | 1/1957 | Brown |
| 2,807,443 A | 9/1957 | Wyman |
| 2,815,932 A | 12/1957 | Wolfram |
| 2,819,041 A | 1/1958 | Beckham |
| 2,819,043 A | 1/1958 | Henderson |
| 2,838,284 A | 6/1958 | Austin |
| 2,873,093 A | 2/1959 | Hildebrandt |
| 2,877,984 A | 3/1959 | Causey |
| 2,894,722 A | 7/1959 | Buttolph |
| 2,901,223 A | 8/1959 | Scott |
| 2,942,850 A | 6/1960 | Heath |
| 2,942,851 A | 6/1960 | Beck |
| 2,963,102 A | 12/1960 | Smith |
| 2,972,713 A | 2/1961 | Sutton, Jr. |
| 2,998,085 A | 8/1961 | Dulaney |
| 3,036,645 A | 5/1962 | Scott |
| 3,055,443 A | 9/1962 | Edwards |
| 3,058,532 A | 10/1962 | Lee |
| 3,059,708 A | 10/1962 | Cannon et al. |
| 3,075,592 A | 1/1963 | Overly et al. |
| 3,077,936 A | 2/1963 | Arutunoff |
| 3,089,215 A | 5/1963 | Stubbs |
| 3,135,341 A | 6/1964 | Ritter |
| 3,139,147 A | 6/1964 | Hays |
| 3,163,243 A | 12/1964 | Cleary |
| 3,199,617 A | 8/1965 | White |
| 3,216,514 A | 11/1965 | Nelson |
| 3,254,392 A | 6/1966 | Novkov |
| 3,268,259 A | 8/1966 | Arthur |
| 3,294,186 A | 12/1966 | Buell |
| 3,301,339 A | 1/1967 | Pennebaker, Jr. |
| 3,336,081 A | 8/1967 | Ericsson |
| 3,342,531 A | 9/1967 | Krekeler |
| 3,342,532 A | 9/1967 | Krekeler |
| 3,346,060 A | 10/1967 | Beyer |
| 3,379,264 A | 4/1968 | Cox |
| 3,387,673 A | 6/1968 | Thompson |
| 3,397,012 A | 8/1968 | Krekeler |
| 3,397,013 A | 8/1968 | Krekeler |
| 3,429,390 A | 2/1969 | Bennett |
| 3,433,331 A | 3/1969 | Heyberger |
| 3,455,158 A | 7/1969 | Richter, Jr. et al. |
| 3,493,165 A | 2/1970 | Schonfeld |
| 3,512,838 A | 5/1970 | Kniff |
| 3,519,309 A | 7/1970 | Engle |
| 3,583,504 A | 6/1971 | Aalund |
| 3,595,124 A | 7/1971 | Lindstrand et al. |
| 3,626,775 A | 12/1971 | Gentry |
| 3,627,381 A | 12/1971 | Krekeler |
| 3,635,296 A | 1/1972 | Lebourg |
| 3,650,565 A | 3/1972 | Kniff |
| 3,655,244 A | 4/1972 | Swisher |
| 3,667,556 A | 6/1972 | Henderson |
| 3,688,852 A | 9/1972 | Gaylord et al. |
| 3,732,143 A | 5/1973 | Joosse |
| 3,745,396 A | 7/1973 | Quintal et al. |
| 3,745,623 A | 7/1973 | Wentorf, Jr. et al. |
| 3,746,396 A | 7/1973 | Radd |
| 3,764,493 A | 10/1973 | Rosar et al. |
| 3,765,493 A | 10/1973 | Rosar et al. |
| 3,767,266 A | 10/1973 | Krekeler |
| 3,771,612 A | 11/1973 | Adcock |
| 3,778,112 A | 12/1973 | Krekeler |
| 3,800,891 A | 4/1974 | White et al. |
| 3,801,158 A | 4/1974 | Radd et al. |
| 3,807,512 A | 4/1974 | Pogonowski |
| 3,807,804 A | 4/1974 | Kniff |
| 3,815,692 A | 6/1974 | Varley |
| 3,820,848 A | 6/1974 | Kniff |
| 3,821,993 A | 7/1974 | Kniff et al. |
| 3,830,321 A | 8/1974 | McKenry |
| 3,865,437 A | 2/1975 | Crosby |
| 3,885,638 A | 5/1975 | Skidmore |
| 3,899,033 A | 8/1975 | Van Huisen et al. |
| 3,929,054 A | 12/1975 | Gutshall |
| 3,932,952 A | 1/1976 | Helton |
| 3,942,838 A | 3/1976 | Bailey et al. |
| 3,945,681 A | 3/1976 | White |
| 3,955,535 A | 5/1976 | Stock |
| 3,955,635 A | 5/1976 | Skidmore |
| 3,957,307 A | 5/1976 | Varde |
| 3,960,223 A | 6/1976 | Kleine |
| 3,989,114 A | 11/1976 | Tschirky |
| 4,005,914 A | 2/1977 | Newman |
| 4,006,936 A | 2/1977 | Crabiel |
| 4,076,318 A | 2/1978 | Hauschopp et al. |
| 4,081,042 A | 3/1978 | Johnson et al. |
| 4,084,856 A | 4/1978 | Emmerich et al. |
| 4,096,917 A | 6/1978 | Harris |
| 4,106,577 A | 8/1978 | Summers |
| 4,109,737 A | 8/1978 | Bovenkerk |
| RE29,900 E | 2/1979 | Kniff |
| 4,140,004 A | 2/1979 | Smith et al. |
| 4,149,753 A | 4/1979 | Stoltz et al. |
| 4,165,790 A | 8/1979 | Emmerich |
| 4,176,723 A | 12/1979 | Arceneaux |
| 4,186,628 A | 2/1980 | Bonnice |
| 4,199,035 A | 4/1980 | Thompson |
| 4,200,159 A * | 4/1980 | Peschel et al. ................ 175/428 |
| 4,201,421 A | 5/1980 | Den Besten |
| 4,207,964 A | 6/1980 | Taguchi |
| 4,211,508 A | 7/1980 | Dill et al. |
| 4,224,380 A | 9/1980 | Bovenkerk et al. |
| 4,247,150 A | 1/1981 | Wrulich et al. |
| 4,251,109 A | 2/1981 | Roepke |
| 4,253,533 A | 3/1981 | Baker, III |
| 4,262,758 A | 4/1981 | Evans |
| 4,268,089 A | 5/1981 | Spence et al. |
| 4,277,106 A | 7/1981 | Sahley |
| 4,280,573 A | 7/1981 | Sudnishnikov et al. |
| 4,289,211 A | 9/1981 | Lumen |
| 4,304,312 A | 12/1981 | Larsson |
| 4,307,786 A | 12/1981 | Evans |
| D264,217 S | 5/1982 | Prause et al. |
| 4,333,902 A | 6/1982 | Hara |
| 4,333,986 A | 6/1982 | Tsuji et al. |
| 4,337,980 A | 7/1982 | Krekeler |
| 4,386,669 A | 6/1983 | Evans |
| 4,390,992 A | 6/1983 | Judd |
| 4,397,361 A | 8/1983 | Langford, Jr. |
| 4,397,362 A | 8/1983 | Dice et al. |
| 4,412,980 A | 11/1983 | Tsuji et al. |
| 4,416,339 A | 11/1983 | Baker et al. |
| 4,425,315 A | 1/1984 | Tsuji et al. |
| 4,443,038 A | 4/1984 | Brown |
| 4,445,580 A | 5/1984 | Sahley |
| 4,448,269 A | 5/1984 | Ishikawa et al. |
| 4,478,296 A | 10/1984 | Richman |
| 4,481,016 A | 11/1984 | Campbell et al. |
| 4,484,644 A | 11/1984 | Cook |
| 4,484,783 A | 11/1984 | Emmerich |

(56) References Cited

U.S. PATENT DOCUMENTS

| | | | |
|---|---|---|---|
| 4,489,986 A | 12/1984 | Dziak | |
| 4,497,520 A | 2/1985 | Ojanen | |
| 4,499,795 A | 2/1985 | Radtke | |
| 4,525,178 A | 6/1985 | Hall | |
| 4,531,592 A | 7/1985 | Hayatdavoudi | |
| 4,535,853 A | 8/1985 | Ippolito et al. | |
| 4,537,448 A | 8/1985 | Ketterer | |
| 4,538,691 A | 9/1985 | Dennis | |
| 4,542,942 A | 9/1985 | Zitz et al. | |
| 4,566,545 A | 1/1986 | Story et al. | |
| 4,570,725 A * | 2/1986 | Matthias et al. | 175/432 |
| 4,574,895 A | 3/1986 | Dolezal et al. | |
| 4,583,592 A | 4/1986 | Gazda et al. | |
| 4,583,786 A | 4/1986 | Thorpe et al. | |
| 4,597,454 A | 7/1986 | Schoeffler | |
| 4,599,731 A | 7/1986 | Ware et al. | |
| 4,604,106 A | 8/1986 | Hall | |
| 4,612,987 A | 9/1986 | Cheek | |
| 4,615,399 A | 10/1986 | Schoeffler | |
| 4,624,306 A | 11/1986 | Traver et al. | |
| 4,627,503 A | 12/1986 | Horton | |
| 4,627,665 A | 12/1986 | Ewing | |
| 4,636,253 A | 1/1987 | Nakai et al. | |
| 4,637,479 A | 1/1987 | Leising | |
| 4,640,374 A | 2/1987 | Dennis | |
| 4,647,111 A | 3/1987 | Bronder et al. | |
| 4,647,546 A | 3/1987 | Hall, Jr. et al. | |
| 4,650,776 A | 3/1987 | Cerceau et al. | |
| 4,657,308 A | 4/1987 | Clapham | |
| 4,660,890 A | 4/1987 | Mills | |
| 4,662,348 A | 5/1987 | Hall et al. | |
| 4,664,705 A | 5/1987 | Horton et al. | |
| 4,669,786 A | 6/1987 | Morgan et al. | |
| 4,678,237 A | 7/1987 | Collin | |
| 4,679,637 A | 7/1987 | Cherrington et al. | |
| 4,682,987 A | 7/1987 | Brady | |
| 4,683,781 A | 8/1987 | Kar et al. | |
| 4,684,176 A | 8/1987 | Den Besten et al. | |
| 4,688,856 A | 8/1987 | Elfgen | |
| 4,690,691 A | 9/1987 | Komanduri | |
| 4,694,913 A | 9/1987 | McDonald et al. | |
| 4,694,918 A | 9/1987 | Hall | |
| 4,702,525 A | 10/1987 | Sollami | |
| 4,713,897 A | 12/1987 | Hemphill | |
| 4,720,199 A | 1/1988 | Geczy et al. | |
| 4,725,098 A | 2/1988 | Beach | |
| 4,726,718 A | 2/1988 | Meskin et al. | |
| 4,728,153 A | 3/1988 | Ojanen | |
| 4,729,440 A | 3/1988 | Hall | |
| 4,729,603 A | 3/1988 | Elfgen | |
| 4,732,226 A | 3/1988 | Ebeling et al. | |
| 4,733,734 A | 3/1988 | Bardin | |
| 4,736,533 A | 4/1988 | May | |
| 4,746,379 A | 5/1988 | Rabinkin | |
| 4,765,686 A | 8/1988 | Adams | |
| 4,765,687 A | 8/1988 | Parrott | |
| 4,775,017 A | 10/1988 | Forrest et al. | |
| 4,798,026 A | 1/1989 | Cerceau | |
| 4,804,231 A | 2/1989 | Buljan et al. | |
| 4,811,801 A | 3/1989 | Salesky et al. | |
| 4,817,739 A | 4/1989 | Jeter | |
| 4,821,819 A | 4/1989 | Whysong | |
| 4,828,327 A | 5/1989 | Wechner | |
| 4,836,301 A | 6/1989 | Van Dongen et al. | |
| 4,836,614 A | 6/1989 | Ojanen | |
| 4,850,649 A | 7/1989 | Beach et al. | |
| 4,852,672 A | 8/1989 | Behrens | |
| 4,854,405 A * | 8/1989 | Stroud | 175/374 |
| 4,858,706 A | 8/1989 | Lebourgh | |
| 4,875,531 A | 10/1989 | Biehl et al. | |
| 4,880,154 A | 11/1989 | Tank | |
| 4,880,247 A | 11/1989 | Herridge | |
| 4,889,017 A | 12/1989 | Fuller et al. | |
| 4,893,875 A | 1/1990 | Lonn | |
| D305,871 S | 2/1990 | Geiger | |
| 4,907,665 A | 3/1990 | Kar et al. | |
| 4,911,503 A | 3/1990 | Stiffler | |
| 4,911,504 A | 3/1990 | Stiffler | |
| 4,921,310 A | 5/1990 | Hedlund et al. | |
| 4,924,499 A | 5/1990 | Serby | |
| D308,683 S | 6/1990 | Meyer | |
| 4,932,723 A | 6/1990 | Mills | |
| 4,934,467 A | 6/1990 | Langford | |
| 4,938,297 A | 7/1990 | Schmidt | |
| 4,940,099 A | 7/1990 | Deane et al. | |
| 4,940,288 A | 7/1990 | Stiffler | |
| 4,941,711 A | 7/1990 | Stiffler | |
| 4,944,559 A | 7/1990 | Sionnet | |
| 4,944,772 A | 7/1990 | Cho | |
| 4,951,762 A | 8/1990 | Lundell | |
| 4,956,238 A | 9/1990 | Griffin | |
| 4,962,822 A | 10/1990 | Pascale | |
| RE33,494 E | 12/1990 | Hindmarsh et al. | |
| 4,974,688 A | 12/1990 | Helton | |
| 4,979,577 A | 12/1990 | Walter | |
| 4,981,184 A | 1/1991 | Knowlton et al. | |
| 4,981,328 A | 1/1991 | Stiffler | |
| 4,991,667 A | 2/1991 | Wilkes et al. | |
| 4,991,670 A | 2/1991 | Fuller | |
| 5,007,685 A * | 4/1991 | Beach et al. | 299/85.2 |
| 5,009,273 A | 4/1991 | Grabinski | |
| 5,011,515 A | 4/1991 | Frushour | |
| 5,018,793 A | 5/1991 | Den Besten | |
| 5,027,914 A | 7/1991 | Wilson | |
| 5,038,873 A | 8/1991 | Jurgens | |
| 5,052,503 A | 10/1991 | Lof | |
| 5,054,217 A | 10/1991 | Nilsson et al. | |
| 5,074,623 A | 12/1991 | Hedlund et al. | |
| D324,056 S | 2/1992 | Frazee | |
| D324,226 S | 2/1992 | Frazee | |
| 5,088,568 A | 2/1992 | Simuni | |
| 5,088,797 A | 2/1992 | O'Neill | |
| 5,094,304 A | 3/1992 | Briggs | |
| 5,098,167 A | 3/1992 | Latham | |
| 5,098,233 A * | 3/1992 | Patterson et al. | 407/101 |
| 5,098,767 A | 3/1992 | Linnersten | |
| 5,099,927 A | 3/1992 | Gibson et al. | |
| 5,103,919 A | 4/1992 | Warren et al. | |
| 5,106,166 A | 4/1992 | O'Neill | |
| 5,119,714 A | 6/1992 | Scott | |
| 5,119,892 A | 6/1992 | Clegg et al. | |
| 5,135,060 A | 8/1992 | Ide | |
| 5,141,063 A | 8/1992 | Quesenbury | |
| 5,141,289 A | 8/1992 | Stiffler | |
| D329,809 S | 9/1992 | Bloomfield | |
| 5,148,875 A | 9/1992 | Karlsson et al. | |
| 5,154,245 A | 10/1992 | Waldenstrom | |
| 5,176,212 A | 1/1993 | Tandberg | |
| 5,186,268 A | 2/1993 | Clegg | |
| 5,186,592 A | 2/1993 | Pope | |
| 5,193,628 A | 3/1993 | Hill et al. | |
| 5,222,566 A | 6/1993 | Taylor et al. | |
| 5,224,560 A * | 7/1993 | Fernandez | 175/374 |
| 5,248,006 A | 9/1993 | Scott et al. | |
| 5,251,964 A | 10/1993 | Ojanen | |
| 5,255,749 A | 10/1993 | Bumpurs et al. | |
| 5,259,469 A | 11/1993 | Stjernstrom et al. | |
| 5,261,499 A | 11/1993 | Grubb | |
| 5,265,682 A | 11/1993 | Russell et al. | |
| D342,268 S | 12/1993 | Meyer | |
| 5,303,984 A | 4/1994 | Ojanen | |
| 5,304,342 A | 4/1994 | Hall, Jr. et al. | |
| 5,311,953 A | 5/1994 | Walker | |
| 5,314,030 A | 5/1994 | Peterson | |
| 5,332,348 A | 7/1994 | Lemelson | |
| 5,333,938 A | 8/1994 | Gale | |
| 5,351,770 A | 10/1994 | Cawthorne et al. | |
| 5,361,859 A | 11/1994 | Tibbitts | |
| 5,374,111 A | 12/1994 | Den Besten | |
| 5,374,319 A | 12/1994 | Stueber et al. | |
| 5,388,649 A | 2/1995 | Ilomaki | |
| D357,485 S | 4/1995 | Mattsson et al. | |
| 5,410,303 A | 4/1995 | Comeau et al. | |
| 5,415,462 A | 5/1995 | Massa | |

(56) References Cited

U.S. PATENT DOCUMENTS

| | | | |
|---|---|---|---|
| 5,417,292 A | 5/1995 | Polakoff | |
| 5,417,475 A | 5/1995 | Graham | |
| 5,423,389 A | 6/1995 | Warren et al. | |
| 5,429,199 A * | 7/1995 | Sheirer et al. | 175/321 |
| 5,443,128 A | 8/1995 | Amaudric du chaffaut | |
| 5,447,208 A | 9/1995 | Lund | |
| 5,475,309 A | 12/1995 | Hong | |
| 5,494,477 A | 2/1996 | Flood et al. | |
| 5,503,463 A | 4/1996 | Ojanen | |
| 5,507,357 A | 4/1996 | Hult et al. | |
| D371,374 S | 7/1996 | Fischer et al. | |
| 5,533,582 A | 7/1996 | Tibbitts | |
| 5,535,839 A | 7/1996 | Brady | |
| 5,542,993 A | 8/1996 | Rabinkin | |
| 5,544,713 A | 8/1996 | Dennis | |
| 5,553,678 A | 9/1996 | Barr et al. | |
| 5,560,440 A | 10/1996 | Tibbitts | |
| 5,568,838 A | 10/1996 | Struthers et al. | |
| 5,653,300 A | 8/1997 | Lund | |
| 5,655,614 A | 8/1997 | Azar | |
| 5,662,720 A | 9/1997 | O'Tigheamaigh | |
| 5,678,644 A | 10/1997 | Fielder | |
| 5,702,160 A | 12/1997 | Levankovskii et al. | |
| 5,709,279 A | 1/1998 | Dennis | |
| 5,713,412 A | 2/1998 | Wepfer | |
| 5,720,355 A | 2/1998 | Lamine et al. | |
| 5,720,528 A | 2/1998 | Ritchey | |
| 5,725,283 A | 3/1998 | O'Neill | |
| 5,728,420 A | 3/1998 | Keogh | |
| 5,730,502 A | 3/1998 | Montgomery | |
| 5,732,784 A | 3/1998 | Nelson | |
| 5,738,415 A | 4/1998 | Parrott | |
| 5,758,732 A | 6/1998 | Liw | |
| 5,778,991 A | 7/1998 | Runquist et al. | |
| 5,794,728 A | 8/1998 | Palmberg | |
| 5,811,944 A | 9/1998 | Sampayan et al. | |
| 5,823,632 A | 10/1998 | Burkett | |
| 5,833,021 A | 11/1998 | Mensa-Wilmot et al. | |
| 5,837,071 A | 11/1998 | Anderson | |
| 5,842,747 A | 12/1998 | Winchester | |
| 5,845,547 A | 12/1998 | Sollami | |
| 5,848,657 A | 12/1998 | Flood et al. | |
| 5,871,060 A | 2/1999 | Jensen et al. | |
| 5,875,862 A | 3/1999 | Jurewicz | |
| 5,884,979 A | 3/1999 | Latham | |
| 5,890,552 A | 4/1999 | Scott et al. | |
| 5,896,938 A | 4/1999 | Moeny et al. | |
| 5,901,113 A | 5/1999 | Masak | |
| 5,904,444 A | 5/1999 | Kabeuchi et al. | |
| 5,914,055 A | 6/1999 | Roberts et al. | |
| 5,924,499 A | 7/1999 | Birchak et al. | |
| 5,935,718 A | 8/1999 | Demo | |
| 5,944,129 A | 8/1999 | Jenson | |
| 5,947,215 A | 9/1999 | Lundell | |
| 5,950,743 A | 9/1999 | Cox | |
| 5,957,223 A | 9/1999 | Doster et al. | |
| 5,957,225 A | 9/1999 | Sinor | |
| 5,967,247 A | 10/1999 | Pessier | |
| 5,967,250 A | 10/1999 | Lund | |
| 5,978,644 A | 11/1999 | Sato et al. | |
| 5,979,571 A | 11/1999 | Scott et al. | |
| 5,992,405 A | 11/1999 | Sollami | |
| 5,992,547 A | 11/1999 | Caraway et al. | |
| 5,992,548 A | 11/1999 | Silva et al. | |
| 6,000,483 A | 12/1999 | Jurewicz et al. | |
| 6,003,623 A | 12/1999 | Miess | |
| 6,004,349 A | 12/1999 | Jackson | |
| 6,006,846 A | 12/1999 | Tibbitts | |
| 6,018,729 A | 1/2000 | Zacharia et al. | |
| 6,019,434 A | 2/2000 | Emmerich | |
| 6,021,589 A | 2/2000 | Cagliari et al. | |
| 6,021,859 A | 2/2000 | Tibbitts et al. | |
| 6,039,131 A | 3/2000 | Beaton | |
| 6,041,875 A | 3/2000 | Rai et al. | |
| 6,044,920 A | 4/2000 | Massa | |
| 6,047,239 A | 4/2000 | Berger et al. | |
| 6,050,350 A | 4/2000 | Morris et al. | |
| 6,056,911 A | 5/2000 | Griffin | |
| 6,059,373 A | 5/2000 | Wright et al. | |
| 6,065,552 A | 5/2000 | Scott | |
| 6,068,913 A | 5/2000 | Cho et al. | |
| 6,086,160 A | 7/2000 | Bitelli | |
| 6,089,332 A | 7/2000 | Barr et al. | |
| 6,098,730 A | 8/2000 | Scott et al. | |
| 6,099,081 A | 8/2000 | Warren | |
| 6,102,486 A | 8/2000 | Briese | |
| 6,109,377 A | 8/2000 | Massa et al. | |
| 6,113,195 A | 9/2000 | Mercier | |
| 6,131,675 A | 10/2000 | Anderson | |
| 6,150,822 A | 11/2000 | Hong et al. | |
| 6,161,631 A | 12/2000 | Kennedy et al. | |
| 6,170,917 B1 | 1/2001 | Heinrich | |
| 6,176,552 B1 | 1/2001 | Topka, Jr. et al. | |
| 6,186,251 B1 | 2/2001 | Butcher | |
| 6,196,340 B1 | 3/2001 | Jensen | |
| 6,196,636 B1 | 3/2001 | Mills | |
| 6,196,910 B1 | 3/2001 | Johnson | |
| 6,199,645 B1 | 3/2001 | Anderson et al. | |
| 6,202,761 B1 | 3/2001 | Forney | |
| 6,213,225 B1 | 4/2001 | Chen | |
| 6,213,226 B1 | 4/2001 | Eppink et al. | |
| 6,216,805 B1 | 4/2001 | Lays | |
| 6,220,375 B1 | 4/2001 | Butcher et al. | |
| 6,220,376 B1 | 4/2001 | Lundell | |
| 6,223,824 B1 | 5/2001 | Moyes | |
| 6,223,974 B1 | 5/2001 | Unde | |
| 6,257,673 B1 | 7/2001 | Markham et al. | |
| 6,258,139 B1 | 7/2001 | Jensen | |
| 6,260,639 B1 | 7/2001 | Yong et al. | |
| 6,269,069 B1 | 7/2001 | Ishida | |
| 6,269,893 B1 | 8/2001 | Beaton et al. | |
| 6,270,165 B1 | 8/2001 | Peay | |
| 6,272,748 B1 | 8/2001 | Smyth | |
| 6,283,234 B1 * | 9/2001 | Torbet | 175/432 |
| 6,290,008 B1 | 9/2001 | Portwood et al. | |
| 6,296,069 B1 | 10/2001 | Lamine et al. | |
| 6,302,224 B1 | 10/2001 | Sherwood, Jr. | |
| 6,302,225 B1 | 10/2001 | Yoshida et al. | |
| 6,315,065 B1 | 11/2001 | Yong et al. | |
| 6,321,858 B1 | 11/2001 | Wentworth et al. | |
| 6,331,035 B1 | 12/2001 | Montgomery, Jr. | |
| 6,332,503 B1 | 12/2001 | Pessier et al. | |
| 6,340,064 B2 | 1/2002 | Fielder et al. | |
| 6,341,823 B1 | 1/2002 | Sollami | |
| 6,354,771 B1 | 3/2002 | Bauschulte | |
| 6,357,832 B1 | 3/2002 | Sollami | |
| 6,364,034 B1 | 4/2002 | Schoeffler | |
| 6,364,038 B1 | 4/2002 | Driver | |
| 6,364,420 B1 | 4/2002 | Sollami | |
| 6,371,567 B1 | 4/2002 | Sollami | |
| 6,375,272 B1 | 4/2002 | Ojanen | |
| 6,375,706 B2 | 4/2002 | Kembaiyan et al. | |
| 6,394,200 B1 | 5/2002 | Watson et al. | |
| 6,408,052 B1 | 6/2002 | McGeoch | |
| 6,408,959 B2 | 6/2002 | Bertagnolli et al. | |
| 6,419,278 B1 | 7/2002 | Cunningham | |
| 6,429,398 B1 | 8/2002 | Legoupil et al. | |
| 6,439,326 B1 | 8/2002 | Huang et al. | |
| 6,450,269 B1 | 9/2002 | Wentworth et al. | |
| 6,454,030 B1 | 9/2002 | Findley et al. | |
| 6,460,637 B1 | 10/2002 | Siracki et al. | |
| 6,467,341 B1 | 10/2002 | Boucher et al. | |
| 6,468,368 B1 | 10/2002 | Merrick et al. | |
| 6,474,425 B1 | 11/2002 | Truax et al. | |
| 6,478,383 B1 | 11/2002 | Ojanen | |
| 6,481,803 B2 | 11/2002 | Ritchey | |
| 6,484,819 B1 | 11/2002 | Harrison | |
| 6,484,825 B2 | 11/2002 | Watson et al. | |
| 6,484,826 B1 | 11/2002 | Anderson et al. | |
| 6,499,547 B2 | 12/2002 | Scott | |
| 6,508,318 B1 | 1/2003 | Linden et al. | |
| 6,508,516 B1 | 1/2003 | Kammerer | |
| 6,508,518 B1 | 1/2003 | Kammerer | |
| 6,510,906 B1 | 1/2003 | Richert et al. | |

(56) References Cited

U.S. PATENT DOCUMENTS

| | | |
|---|---|---|
| 6,513,606 B1 | 2/2003 | Krueger |
| 6,517,902 B2 | 2/2003 | Drake |
| 6,533,050 B2 | 3/2003 | Molloy |
| 6,554,369 B2 | 4/2003 | Sollami |
| 6,561,293 B2 | 5/2003 | Minikus et al. |
| 6,562,462 B2 | 5/2003 | Griffin et al. |
| RE38,151 E | 6/2003 | Penkunas |
| D477,225 S | 7/2003 | Pinnavaia |
| 6,585,326 B2 | 7/2003 | Sollami |
| 6,585,327 B2 | 7/2003 | Sollami |
| 6,592,985 B2 | 7/2003 | Griffin et al. |
| 6,594,881 B2 | 7/2003 | Tibbitts |
| 6,596,225 B1 | 7/2003 | Pope et al. |
| 6,601,454 B1 | 8/2003 | Botnan |
| 6,601,662 B2 | 8/2003 | Matthias et al. |
| 6,622,803 B2 | 9/2003 | Harvey |
| 6,644,755 B1 | 11/2003 | Kammerer |
| 6,651,758 B2 | 11/2003 | Xiang et al. |
| 6,652,202 B2 | 11/2003 | Remke |
| 6,659,206 B2 | 12/2003 | Liang et al. |
| 6,668,949 B1 | 12/2003 | Rives |
| 6,672,406 B2 | 1/2004 | Beuershausen |
| 6,685,273 B1 | 2/2004 | Sollami |
| 6,692,063 B2 | 2/2004 | Latham |
| 6,698,537 B2 | 3/2004 | Pascale |
| 6,702,393 B2 | 3/2004 | Mercier |
| 6,709,065 B2 | 3/2004 | Peay |
| 6,711,060 B2 | 3/2004 | Sakakibara |
| 6,719,074 B2 | 4/2004 | Tsuda |
| 6,729,420 B2 | 5/2004 | Mensa-Wilmot |
| 6,732,817 B2 | 5/2004 | Dewey et al. |
| 6,732,914 B2 | 5/2004 | Cadden et al. |
| 6,733,087 B2 | 5/2004 | Hall |
| 6,739,327 B2 | 5/2004 | Sollami |
| 6,749,033 B2 | 6/2004 | Griffin et al. |
| 6,758,530 B2 | 7/2004 | Sollami |
| D494,031 S | 8/2004 | Moore, Jr. |
| D494,064 S | 8/2004 | Hook |
| 6,772,849 B2 | 8/2004 | Oldham |
| 6,786,557 B2 | 9/2004 | Montgomery, Jr. |
| 6,789,635 B2 | 9/2004 | Wentworth et al. |
| 6,802,676 B2 | 10/2004 | Noggle |
| 6,822,579 B2 | 11/2004 | Goswami et al. |
| 6,824,225 B2 | 11/2004 | Stiffler |
| 6,846,045 B2 | 1/2005 | Sollami |
| 6,851,758 B2 | 2/2005 | Beach |
| 6,854,810 B2 | 2/2005 | Montgomery, Jr. |
| 6,863,352 B2 | 3/2005 | Sollami |
| 6,878,447 B2 | 4/2005 | Griffin |
| 6,880,648 B2 | 4/2005 | Edscer |
| 6,880,649 B2 | 4/2005 | Esscer |
| 6,880,744 B2 | 4/2005 | Noro et al. |
| 6,889,890 B2 | 5/2005 | Yamazaki |
| 6,929,076 B2 | 8/2005 | Fanuel et al. |
| 6,933,049 B2 | 8/2005 | Wan et al. |
| 6,938,961 B2 | 9/2005 | Broom |
| 6,948,572 B2 | 9/2005 | Hay et al. |
| 6,953,096 B2 | 10/2005 | Gledhill et al. |
| 6,959,765 B2 | 11/2005 | Bell |
| 6,962,395 B2 | 11/2005 | Mouthaan |
| 6,966,611 B1 | 11/2005 | Sollami |
| 6,994,404 B1 | 2/2006 | Sollami |
| 7,048,081 B2 | 5/2006 | Smith et al. |
| 7,094,473 B2 | 8/2006 | Takayama et al. |
| 7,096,980 B2 | 8/2006 | Trevas |
| 7,097,258 B2 | 8/2006 | Sollami |
| 7,104,344 B2 | 9/2006 | Kriesels |
| 7,118,181 B2 | 10/2006 | Frear |
| 7,198,119 B1 | 4/2007 | Hall et al. |
| 7,204,560 B2 | 4/2007 | Mercier |
| 7,207,398 B2 | 4/2007 | Runia et al. |
| 7,225,886 B1 | 6/2007 | Hall |
| 7,234,782 B2 | 6/2007 | Stehney |
| D547,652 S | 7/2007 | Kerman et al. |
| 7,240,744 B1 | 7/2007 | Kernick |
| 7,258,179 B2 | 8/2007 | Hall |
| 7,270,196 B2 | 9/2007 | Hall |
| 7,270,379 B2 | 9/2007 | Stehney |
| 7,306,410 B2 * | 12/2007 | Borschert et al. ............ 408/144 |
| D560,699 S | 1/2008 | Omi |
| 7,316,532 B2 | 1/2008 | Matthys-Mark |
| 7,322,776 B2 | 1/2008 | Webb |
| 7,337,858 B2 | 3/2008 | Hall et al. |
| 7,350,601 B2 | 4/2008 | Belnap et al. |
| 7,360,610 B2 | 4/2008 | Hall et al. |
| 7,369,743 B2 | 5/2008 | Watkins et al. |
| 7,377,341 B2 | 5/2008 | Middlemiss et al. |
| 7,380,888 B2 | 6/2008 | Ojanen |
| 7,384,105 B2 | 6/2008 | Hall et al. |
| 7,387,345 B2 | 6/2008 | Hall et al. |
| 7,390,066 B2 | 6/2008 | Hall et al. |
| 7,396,086 B1 | 7/2008 | Hall et al. |
| 7,398,837 B2 | 7/2008 | Hall et al. |
| 7,413,256 B2 | 8/2008 | Hall et al. |
| 7,413,258 B2 | 8/2008 | Hall et al. |
| 7,419,016 B2 | 9/2008 | Hall et al. |
| 7,419,018 B2 | 9/2008 | Hall et al. |
| 7,424,922 B2 | 9/2008 | Hall et al. |
| 7,426,968 B2 | 9/2008 | Hall et al. |
| 7,464,772 B2 | 12/2008 | Hall et al. |
| 7,481,281 B2 | 1/2009 | Schuaf |
| 7,484,576 B2 | 2/2009 | Hall et al. |
| 7,497,279 B2 | 3/2009 | Hall et al. |
| 7,506,701 B2 | 3/2009 | Hall et al. |
| 7,506,706 B2 | 3/2009 | Hall et al. |
| 7,510,031 B2 | 3/2009 | Russell et al. |
| 7,520,345 B2 * | 4/2009 | Sherwood et al. ............ 175/432 |
| 7,533,737 B2 | 5/2009 | Hall et al. |
| 7,543,662 B2 | 6/2009 | Belnap et al. |
| 7,549,489 B2 | 6/2009 | Hall et al. |
| 7,571,780 B2 | 8/2009 | Hall et al. |
| 7,571,782 B2 | 8/2009 | Hall et al. |
| 7,575,425 B2 | 8/2009 | Hall et al. |
| 7,592,077 B2 | 9/2009 | Gates, Jr. et al. |
| 7,597,159 B2 * | 10/2009 | Overstreet ................. 175/374 |
| 7,617,886 B2 | 11/2009 | Hall |
| 7,641,002 B2 | 1/2010 | Hall et al. |
| 7,661,487 B2 | 2/2010 | Hall et al. |
| 7,665,552 B2 | 2/2010 | Hall |
| 7,694,756 B2 | 4/2010 | Hall et al. |
| 7,703,559 B2 | 4/2010 | Shen et al. |
| 7,730,975 B2 | 6/2010 | Hall et al. |
| 7,730,977 B2 | 6/2010 | Achilles |
| D620,510 S | 7/2010 | Hall |
| 7,753,144 B2 | 7/2010 | Hall et al. |
| 7,798,258 B2 | 9/2010 | Singh et al. |
| 7,992,944 B2 | 8/2011 | Hall et al. |
| 7,992,945 B2 | 8/2011 | Hall et al. |
| 8,011,456 B2 * | 9/2011 | Sherwood, Jr. ............... 175/368 |
| 2001/0004946 A1 | 6/2001 | Jensen |
| 2002/0070602 A1 | 6/2002 | Sollami |
| 2002/0074851 A1 | 6/2002 | Montgomery, Jr. |
| 2002/0153175 A1 | 10/2002 | Ojanen |
| 2003/0015907 A1 | 1/2003 | Sollami |
| 2003/0047985 A1 | 3/2003 | Stiffler |
| 2003/0052530 A1 | 3/2003 | Sollami |
| 2003/0079565 A1 | 5/2003 | Liang et al. |
| 2003/0110667 A1 | 6/2003 | Adachi |
| 2003/0137185 A1 | 7/2003 | Sollami |
| 2003/0140350 A1 | 7/2003 | Noro |
| 2003/0140360 A1 | 7/2003 | Mansuy |
| 2003/0141753 A1 | 7/2003 | Peay et al. |
| 2003/0209366 A1 | 11/2003 | McAlvain |
| 2003/0213354 A1 | 11/2003 | Frers |
| 2003/0213621 A1 | 11/2003 | Britten |
| 2003/0217869 A1 | 11/2003 | Snyder et al. |
| 2003/0230926 A1 | 12/2003 | Mondy et al. |
| 2003/0234280 A1 | 12/2003 | Cadden |
| 2004/0026132 A1 | 2/2004 | Hall |
| 2004/0026983 A1 | 2/2004 | McAlvain |
| 2004/0065484 A1 | 4/2004 | McAlvain |
| 2004/0155096 A1 | 8/2004 | Zimmerman et al. |
| 2004/0228694 A1 | 11/2004 | Webb et al. |
| 2004/0238221 A1 | 12/2004 | Runia et al. |

(56) References Cited

U.S. PATENT DOCUMENTS

| | | |
|---|---|---|
| 2004/0256155 A1 | 12/2004 | Kriesels |
| 2004/0256442 A1 | 12/2004 | Gates, Jr. |
| 2005/0035649 A1 | 2/2005 | Mercier |
| 2005/0044800 A1 | 3/2005 | Hall et al. |
| 2005/0044987 A1 | 3/2005 | Takayama |
| 2005/0159840 A1 | 7/2005 | Lin |
| 2005/0173966 A1 | 8/2005 | Mouthaan |
| 2005/0263327 A1 | 12/2005 | Meiners et al. |
| 2006/0060391 A1 | 3/2006 | Eyre et al. |
| 2006/0086537 A1 | 4/2006 | Dennis |
| 2006/0086540 A1 | 4/2006 | Griffin |
| 2006/0125306 A1 | 6/2006 | Sollami |
| 2006/0162969 A1 | 7/2006 | Belnap et al. |
| 2006/0180354 A1 | 8/2006 | Belnap et al. |
| 2006/0186724 A1 | 8/2006 | Stehney |
| 2006/0237236 A1 | 10/2006 | Sreshta |
| 2006/0261663 A1 | 11/2006 | Sollami |
| 2007/0013224 A1 | 1/2007 | Stehney |
| 2007/0114067 A1 | 5/2007 | Hall |
| 2007/0114068 A1 | 5/2007 | Hall et al. |
| 2007/0119630 A1 | 5/2007 | Hall et al. |
| 2007/0125580 A1 | 6/2007 | Hall et al. |
| 2007/0193782 A1 | 8/2007 | Fang |
| 2007/0221406 A1 | 9/2007 | Hall et al. |
| 2007/0221409 A1 | 9/2007 | Hall et al. |
| 2007/0221412 A1 | 9/2007 | Hall et al. |
| 2007/0221415 A1 | 9/2007 | Hall et al. |
| 2007/0221416 A1 | 9/2007 | Hall et al. |
| 2007/0221417 A1 | 9/2007 | Hall et al. |
| 2007/0229232 A1 | 10/2007 | Hall et al. |
| 2007/0229304 A1 | 10/2007 | Hall et al. |
| 2007/0242565 A1 | 10/2007 | Hall et al. |
| 2007/0278017 A1 | 12/2007 | Shen et al. |
| 2008/0006448 A1 | 1/2008 | Zhang et al. |
| 2008/0011521 A1 | 1/2008 | Hall et al. |
| 2008/0011522 A1 | 1/2008 | Hall et al. |
| 2008/0029312 A1 | 2/2008 | Hall et al. |
| 2008/0030065 A1 | 2/2008 | Frear |
| 2008/0053710 A1 | 3/2008 | Moss |
| 2008/0073126 A1 | 3/2008 | Shen et al. |
| 2008/0073127 A1 | 3/2008 | Zhan et al. |
| 2008/0084106 A1 | 4/2008 | Marathe et al. |
| 2008/0099243 A1 | 5/2008 | Hall et al. |
| 2008/0142264 A1 | 6/2008 | Hall et al. |
| 2008/0142265 A1 | 6/2008 | Hall et al. |
| 2008/0142276 A1 | 6/2008 | Griffo et al. |
| 2008/0156544 A1 | 7/2008 | Singh et al. |
| 2008/0173482 A1 | 7/2008 | Hall et al. |
| 2008/0206576 A1 | 8/2008 | Qian et al. |
| 2008/0223622 A1* | 9/2008 | Duggan et al. ............... 175/432 |
| 2008/0302572 A1 | 12/2008 | Hall et al. |
| 2008/0314645 A1 | 12/2008 | Hall et al. |
| 2009/0044663 A1* | 2/2009 | Stevens et al. ............... 76/108.2 |
| 2009/0260894 A1 | 10/2009 | Hall et al. |
| 2010/0000799 A1 | 1/2010 | Hall et al. |
| 2010/0163310 A1* | 7/2010 | Vempati et al. ............... 175/57 |
| 2013/0206483 A1* | 8/2013 | Johnson et al. ............... 175/425 |

FOREIGN PATENT DOCUMENTS

| | | |
|---|---|---|
| DE | 3500261 A1 | 7/1986 |
| DE | 3818213 A1 | 11/1989 |
| DE | 4039217 A1 | 6/1992 |
| DE | 19821147 A1 | 11/1999 |
| DE | 10163717 A1 | 5/2003 |
| DE | 10163717 C1 | 5/2003 |
| EP | 0295151 | 6/1988 |
| EP | 295151 A2 | 6/1988 |
| EP | 0295151 A2 | 12/1988 |
| EP | 412287 A2 | 2/1991 |
| EP | 0412287 A2 | 2/1991 |
| EP | 899051 A1 | 10/2001 |
| EP | 1186744 A2 | 9/2003 |
| EP | 1574309 A1 | 9/2005 |
| GB | 2004315 A | 3/1979 |
| GB | 2037223 A | 7/1980 |
| JP | 05-280273 A | 10/1993 |
| JP | 3123193 | 1/2001 |
| JP | 3123193 B2 | 1/2001 |
| JP | 2002-081524 A | 3/2002 |
| RU | 2079561 C1 | 5/1997 |

OTHER PUBLICATIONS

Durrand, Christopher J., Super-hard, Thick Shaped PDC Cutters for Hard Rock Drilling: Development & Test Results, Geothermal Reservoir Engineering, Stanford, California, Feb. 3, 2010.

Glowka, David A. et al., "Progress in the Advanced Synthetic-Diamond Drill Bit Program", 1995, US Dept. of Energy.

Hoch, Jeffrey G., "Is There Room for Geothermal Energy, Innovation: America's Journal of Tech Communicationhttp://www.innovation-america.orgl", Dec. 2006-Jan. 2007.

Jennejohn, Dan, "Research & Development in Geothermal Exploration & Drilling, pp. 15, 18-19, Geothermal Energy Association, Washington, D.C.", Dec. 1, 2009.

Kennametal Inc. catalog entitled, "Construction Tools," 1997, pp. 1-20.

Taylor Mark A., "The State of Geothermal Technology Part 1: Subsurface Technology, pp. 29-30, Geothermal Energy Association, Washington, D.C.", Nov. 2007.

US Dept. of Energy, Geothermal Drilling Faster & Cheaper is Better, Geothermal Today, p. 28, National Renewal Energy Laboratory Golden, Colorado, May 2000.

International Search Report for International Application No. PCT/US2006/043125, dated Feb. 23, 2007, 1 page; Written Opinion of the International Searching Authority for International Application No. PCT/US2006/043125, dated Jun. 4, 2007, 4 pages; and, International Preliminary Report on Patentability Chapter I for PCT/US2006/043125, dated May 27, 2008, 5 pages.

International Search Report for International Application No. PCT/US2007/064539, dated Jun. 16, 2008, 1 page; Written Opinion of the International Searching Authority for International Application No. PCT/US2007/064539, dated Jun. 16, 2008, 3 pages; and, International Preliminary Report on Patentability Chapter I for PCT/US2007/064539, dated Jun. 16, 2008, 4 pages.

International Search Report for International Application No. PCT/US2007/075670, dated Nov. 17, 2008, 1 page; Written Opinion of the International Searching Authority for International Application No. PCT/US2007/075670, dated Nov. 17, 2008, 5 pages; and, International Preliminary Report on Patentability for PCT/US2007/075670, dated. Aug. 24, 2009, 4 pages.

PCT/US07/64544, International Preliminary Report on Patentability, Written Opinion, and International Search Report, Aug. 5, 2008.

International Search Report for International Application No. PCT/US2008/069231, dated Nov. 18, 2008, 1 page; Written Opinion of the International Searching Authority for International Application No. PCT/US2008/069231, dated Nov. 18, 2008, 4 pages; and, International Preliminary Report on Patentability Chapter I for PCT/US2008/069231, dated Jan. 5, 2010, 5 pages.

* cited by examiner

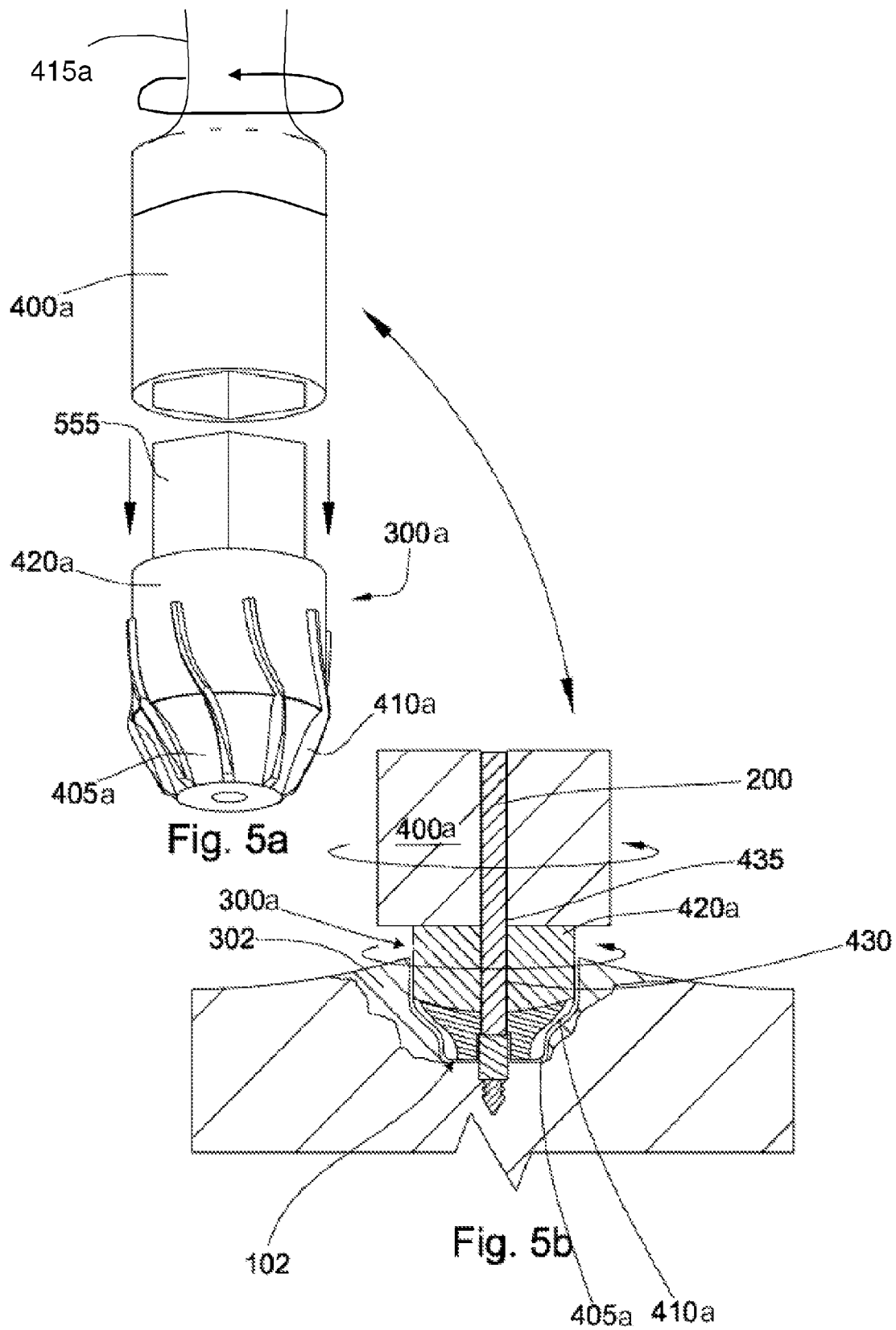

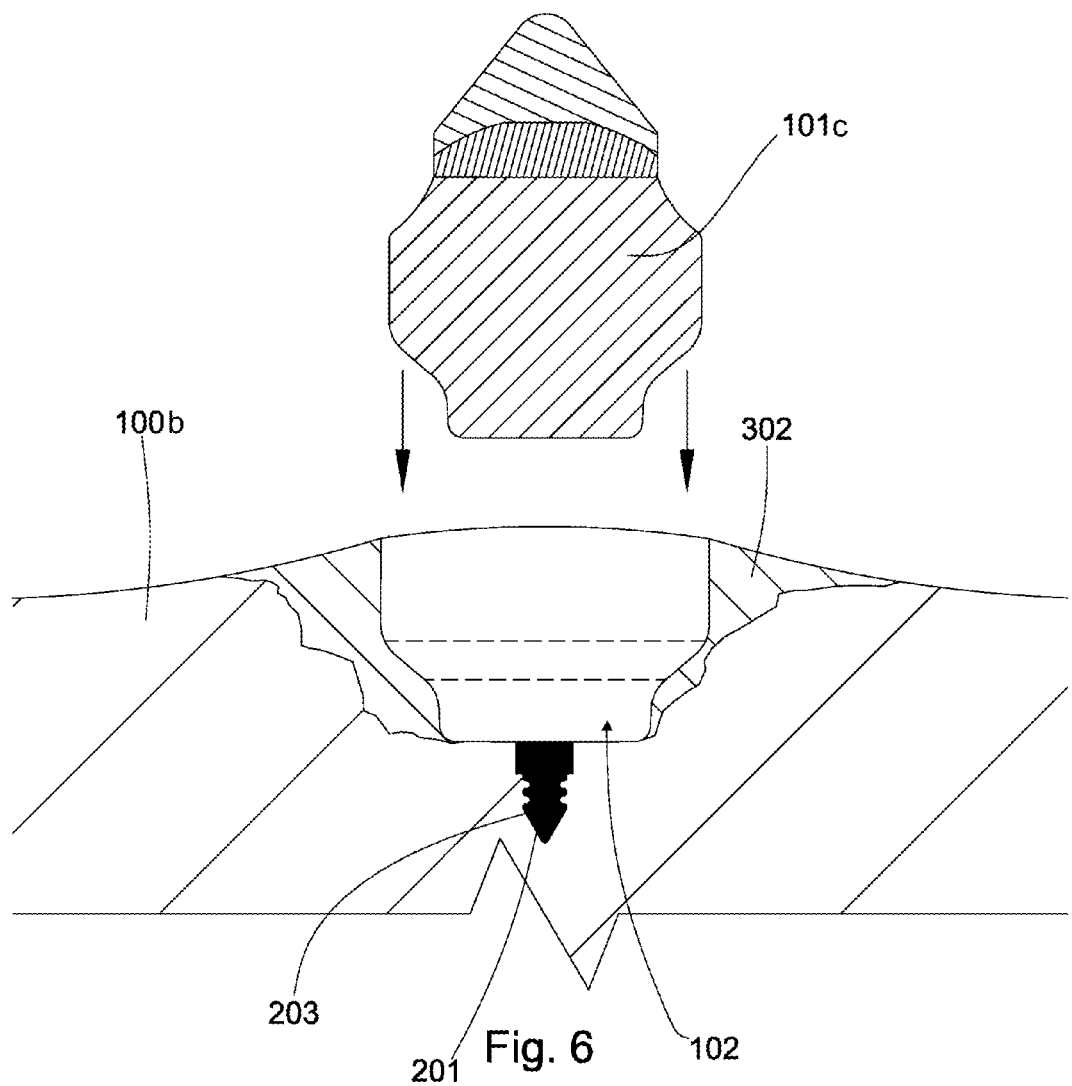

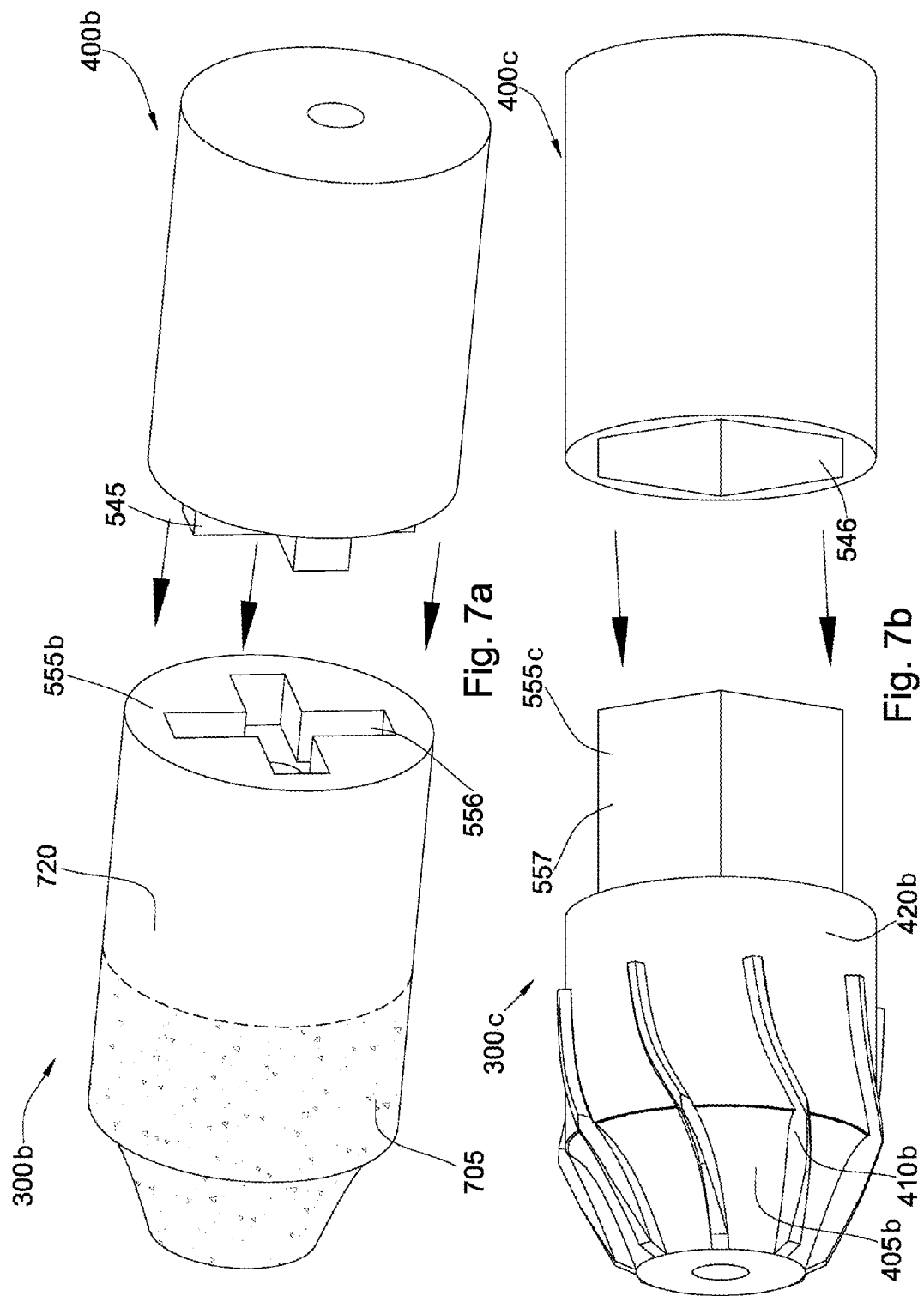

1200

| Providing a pocket formed in a surface and an anchor seated in the pocket; 1201 |

| Connecting an end of a tool attachment comprising a cylindrical shaft to the anchor; 1202 |

| Sliding a hollow bit along the cylindrical shaft of the tool attachment; 1203 |

| Shaping the pocket around an external surface of the hollow bit. 1204 |

DRILL BIT CUTTER POCKET RESTITUTION

BACKGROUND OF THE INVENTION

In downhole drilling applications, a cutting element may be implanted in a pocket on a surface of a degradation assembly. The cutting element may be held in the pocket by means of a press fit, braze, a thermal expansion process, mechanical means, or other means known in the art.

U.S. Pat. No. 4,109,737 to Bovenkerk which is herein incorporated by reference for all that it contains, discloses a pin longitudinally tapered at an angle chosen such that when mounted in recesses of a drill crown, a self-holding or self-locking friction fit is formed.

U.S. Pat. No. 4,199,035 to Thompson which is herein incorporated by reference for all that it contains, discloses a drill bit comprised of composite compact cutters removably secured or attached to a drill crown. The cutter is preferably comprised of a stud or pin with an abrasive composite compact bonded at one end of the stud. The securing means for the cutter is comprised of a sleeve and a bushing fixed in the recess of the bit crown. The sleeve has a threaded outer wall for engagement with a threaded inner wall of the bushing.

U.S. Pat. No. 6,772,849 to Oldham, et al., which is herein incorporated by reference for all it contains, discloses a method of increasing a durability of a drill bit having a bit body with at least one blade disposed thereon, at least one cutter pocket disposed on the blade, and at least one cutter disposed in the cutter pocket. The method includes brazing the at least one cutter to the at least one cutter pocket so that a braze material disposed between the at least one cutter pocket and the at least one cutter comprises an exposed surface, and overlaying at least a portion of the exposed surface with a hardfacing material, wherein the hardfacing material includes a binder having a melting point selected to avoid damaging the cutter.

U.S. Pat. No. 3,771,612 to Adcock which is herein incorporated by reference for all that it contains, discloses a replaceable wear-resistant element assembly having a wear-resistant element and a mounting device for releasably securing the element in the recess of a supporting body. The mounting device is constructed of a one-piece goblet shaped unit having a sleeve portion for receiving the element therein and a stem portion for supporting the element. The stem and sleeve portions are interconnected by a shearable web portion which will fracture when an axial force of sufficient magnitude is applied to the sleeve to cause the sleeve to move downward about the stem to release the element.

Regardless of how the cutting element is mounted within the pocket, frequently after use the pocket holding the cutting element may become worn and may need to be restored.

BRIEF SUMMARY OF THE INVENTION

A pocket restitution assembly comprises a pocket formed in a surface that includes a central axis, an anchor seated in the pocket and aligned with the central axis, a tool attachment comprising a cylindrical shaft and an end for connection to the anchor, and a hollow bit slidably and rotatably sitting on the tool attachment. The hollow bit may fit within the pocket.

The surface that includes the central axis may be disposed on a working face of a drill bit similar to those used in downhole drilling applications.

The cylindrical shaft forming part of the tool attachment may comprise an external threadform and the hollow bit may comprise an internal threadform, wherein the external threadform is designed to mate with the internal threadform. The cylindrical shaft may also comprise a substantially smooth outer diameter intermediate, or between, the external threadform and the end of the tool attachment. The end of the tool attachment may comprise a threaded connection to the anchor. The cylindrical shaft of the tool attachment may comprise a stopping rim disposed adjacent the end and extending a distance into the pocket when the end of the tool attachment is connected to the anchor. This connection may comprise threading the end of the tool attachment into the anchor. The hollow bit may then be slid along the cylindrical shaft of the tool attachment until it halts against the stopping rim. The pocket may then be shaped around an external surface of the hollow bit.

The hollow bit may comprise a top end formed to connect with a driver, wherein the driver may rotate the hollow bit around the cylindrical shaft of the tool attachment. The driver may be a hollow tube comprising an internal geometry formed to accept the top end of the hollow bit. The driver may alternately comprise an external geometry and the top end of the hollow bit may comprise an internal geometry, wherein the external geometry substantially mates with the internal geometry. The driver may be rotated by a hand drill, CNC machine, drill press or combinations thereof.

The hollow bit may additionally comprise an internal recess extending a length substantially equal to the distance of the stopping rim of the tool attachment, wherein the stopping rim may halt the linear advancement of the hollow bit when it makes contact with the internal recess.

The hollow bit may comprise an external geometry substantially the same shape as a cutting element, wherein as a weld material is introduced into the pocket it takes the shape of the external geometry. The hollow bit may comprise a roughing router that includes a cutting surface having at least one cutting blade, wherein as the roughing router rotates the cutting surface cuts a shape within the pocket substantially similar to a cutting element. Alternatively, the hollow bit may comprise a finishing router that includes a finishing surface having an abrasive material, wherein as the finishing router rotates the finishing surface cleans a shape within the pocket substantially similar to a cutting element.

BRIEF DESCRIPTION OF THE DRAWINGS

FIG. 5a is a perspective diagram of an embodiment of a hollow bit engaging with a driver.

FIG. 5b is a cross-sectional diagram of an embodiment of the hollow bit on the tool attachment of FIG. 4b being driven by a driver.

FIG. 6 is a cross-sectional diagram of an embodiment of a cutting element being inserted into the pocket of FIG. 5b with the interior formed of the weld material and after the hollow bit has been removed.

FIG. 7a is a perspective diagram of an embodiment of a hollow bit and a driver.

FIG. 7b is a perspective diagram of another embodiment of a hollow bit and a driver.

FIG. 11 is a flow diagram of an embodiment of a method for restoring a pocket.

DETAILED DESCRIPTION OF THE INVENTION AND THE PREFERRED EMBODIMENT

Figures 1A, 1B:
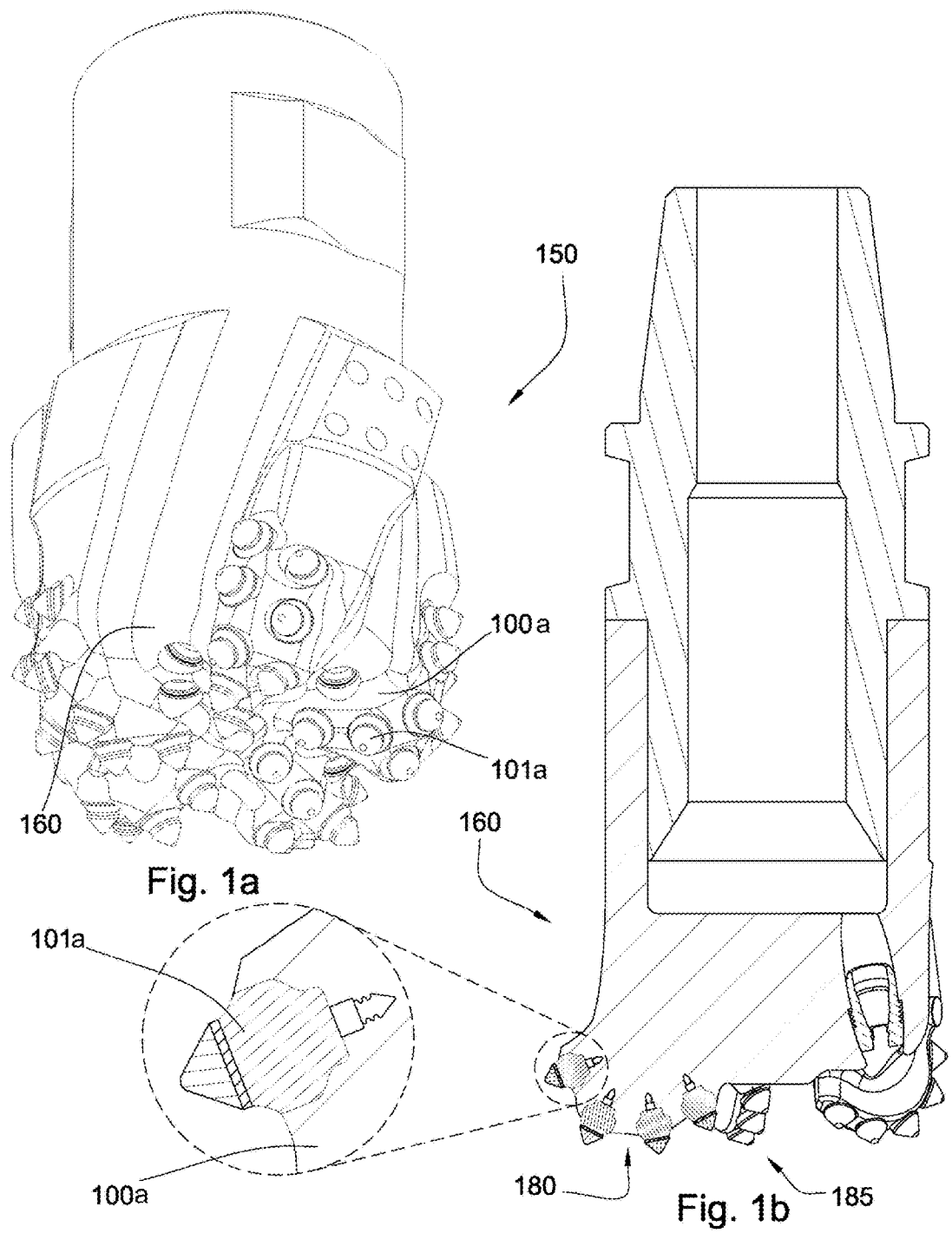
FIG. 1a is a perspective diagram of an embodiment of a rotary drag bit comprising cutting elements implanted in a surface.
FIG. 1b is a cross-sectional diagram of the embodiment of the rotary drag bit in FIG. 1a and a close-up view of a cutting element mounted in a pocket in a surface.

Referring now to the figures, FIG. 1a displays a perspective diagram of an embodiment of a degradation assembly 150 comprising cutting elements 101a implanted in a surface 100a. In the embodiment shown the degradation assembly 150 is in the form of a rotary drag bit 160, however, the degradation assembly may also comprise a percussion drill bit, roller cone bit, a pick, or other degradation assemblies known in the art.

FIG. 1b displays a cross-sectional diagram of the embodiment of the rotary drag bit 160. The rotary drag bit 160 may comprise at least one blade 180 disposed on a working face 185. The blade 180 may comprise the surface 100a where at least one cutting element 101a may be inserted.

Figure 2:
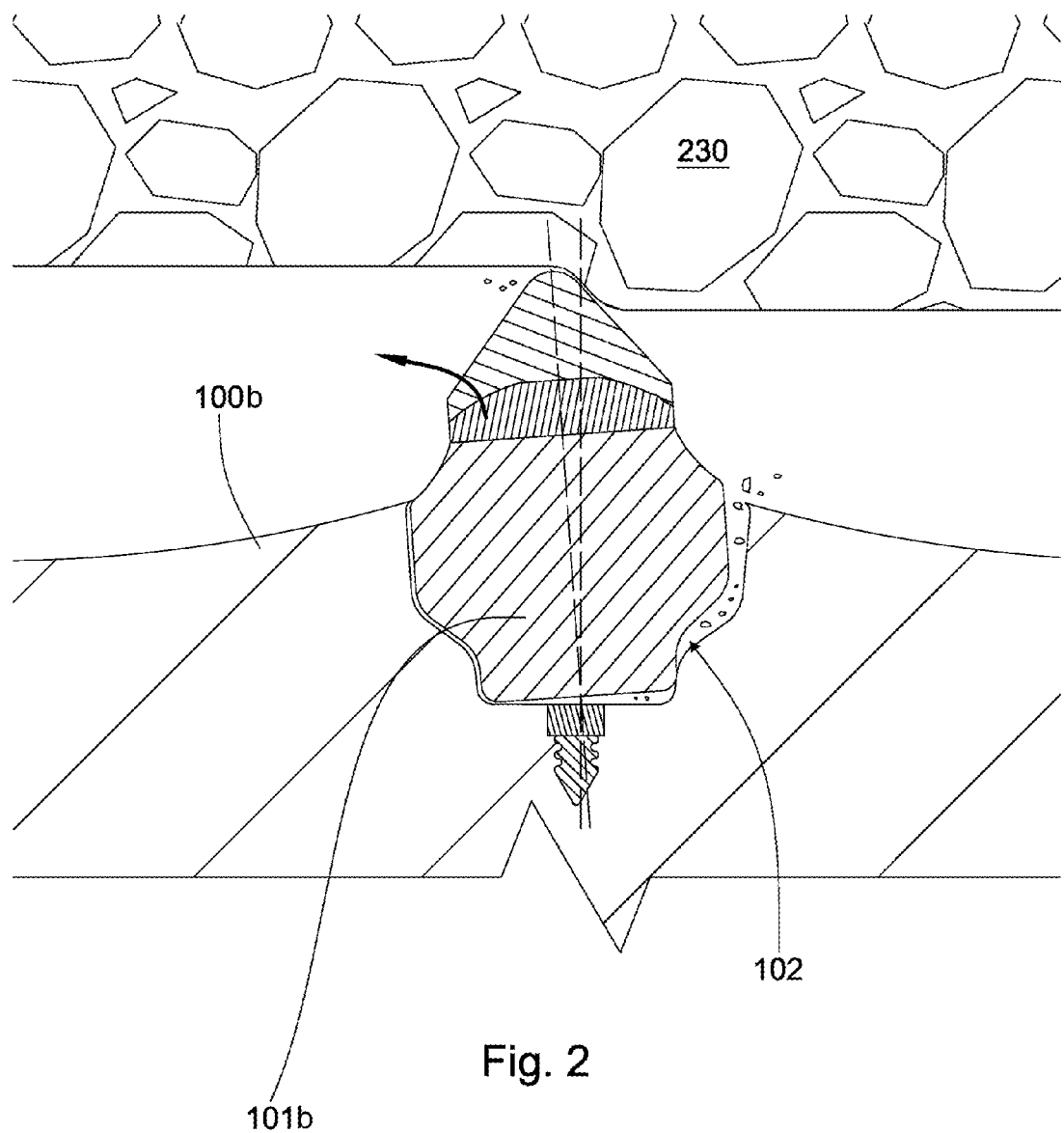
FIG. 2 is a cross-sectional diagram of an embodiment of a cutting element mounted in a pocket in a surface in the act of cutting an earthen formation.

FIG. 2 displays a cross-sectional diagram of an embodiment of a cutting element 101b mounted in a pocket 102 within a surface 100b. The cutting element 101b may be brought into contact with a formation 230 in an attempt to degrade the formation 230. The formation 230 may be an earthen formation or types of manmade formations. After protracted exposure to the formation 230 the cutting element 101b may begin to dislodge from the pocket 102 and thus cause damage to the pocket 102. Following such wear it may be desirous to replace the cutting element 101b in an attempt to restore it to its original operating efficiency. Replacing the cutting element 101b may require repairing the pocket 102 and the surface 100b before a replacement cutting element 101b may be inserted.

Repairing the pocket 102 and surface 100b may involve first removing the cutting element 101b from the pocket 102. In cases of severe wear the cutting element 101b may have already dislodged from the pocket 102. After having removed the cutting element 101b from the pocket 102, the pocket 102 and surrounding surface 100b may be reformed.

Figure 3A:
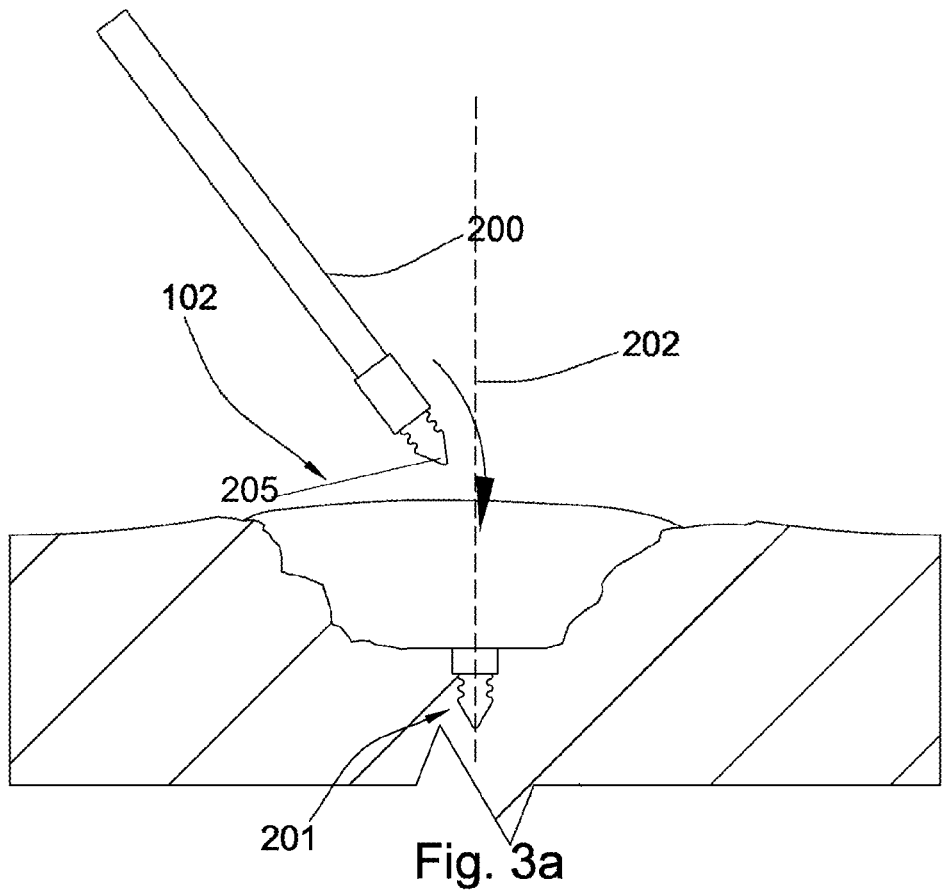
FIG. 3a is a cross-sectional diagram of an embodiment of an anchor within the pocket in the surface of FIG. 2 after the cutting element has been removed and a tool attachment being inserted into the pocket.
Figure 3B:
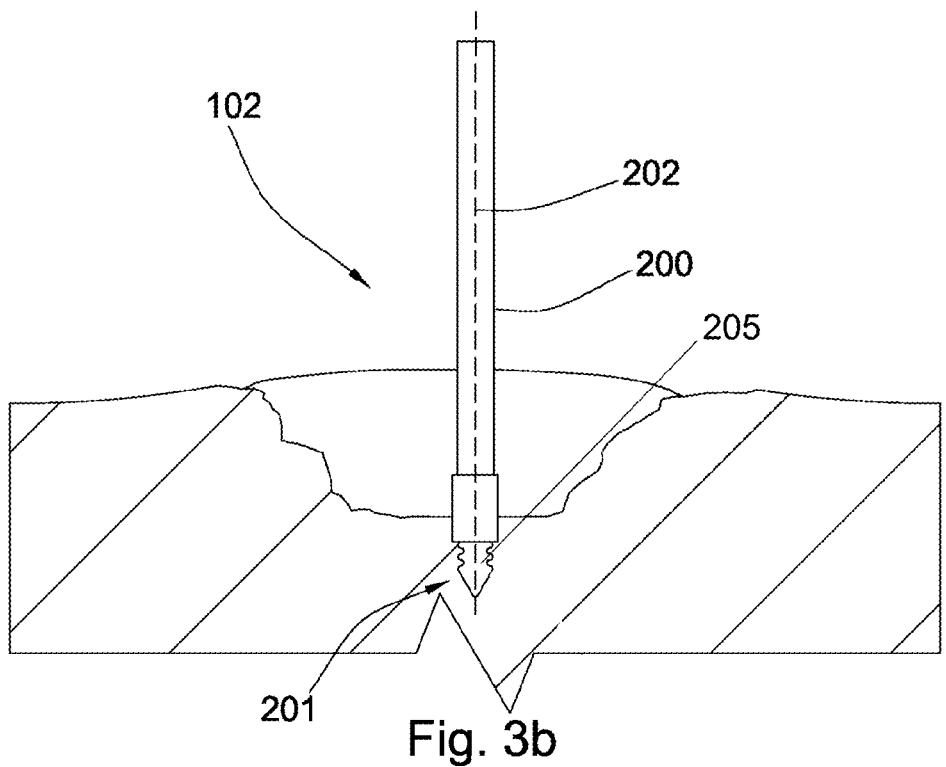
FIG. 3b is a cross-sectional diagram of the embodiment of a tool attachment in FIG. 3a now secured to the anchor within the pocket in the surface.

FIGS. 3a and 3b display an anchor 201 disposed within the pocket 102 and along a central axis 202 of the pocket 102. A filler (such as filler 203 in FIG. 6 discussed below) may have been previously inserted into the anchor 201 to prevent loose material or debris from entering into the anchor 201, but already may have been removed using a common screwdriver or similar pointed object.

With the filler removed from the anchor 201, a tool attachment 200 may be secured into the anchor 201 through an end 205, such as a threadform or threaded connection, snap ring, press fit, adhesive, weld, latch, lock or combinations thereof. The tool attachment 200 may comprise a non-wettable surface that is non-wettable with weld material. FIG. 3a displays an embodiment of a tool attachment 200 being brought into the pocket 102. FIG. 3b displays an embodiment of the tool attachment 200 being secured into the anchor 201 via an end 205 having a threadform or threaded connection.

Figure 4A:
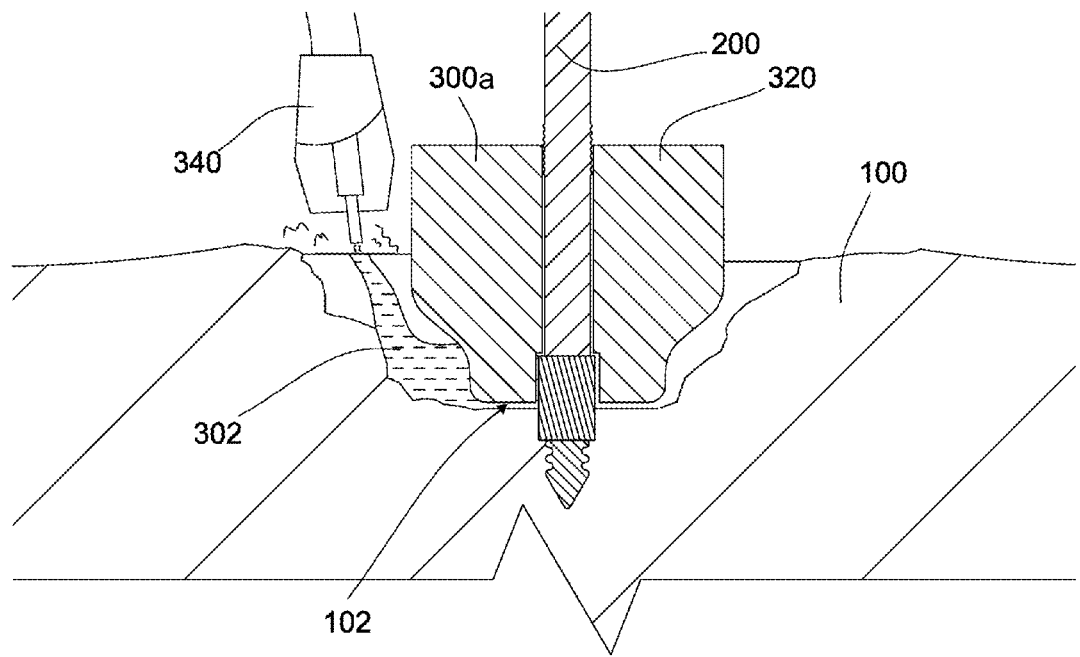
FIG. 4a is a cross-sectional diagram of an embodiment of a hollow bit on the tool attachment within the pocket in the surface of FIG. 3b and a weld material being inserted into the pocket and substantially surrounding the hollow bit.
Figure 4B:
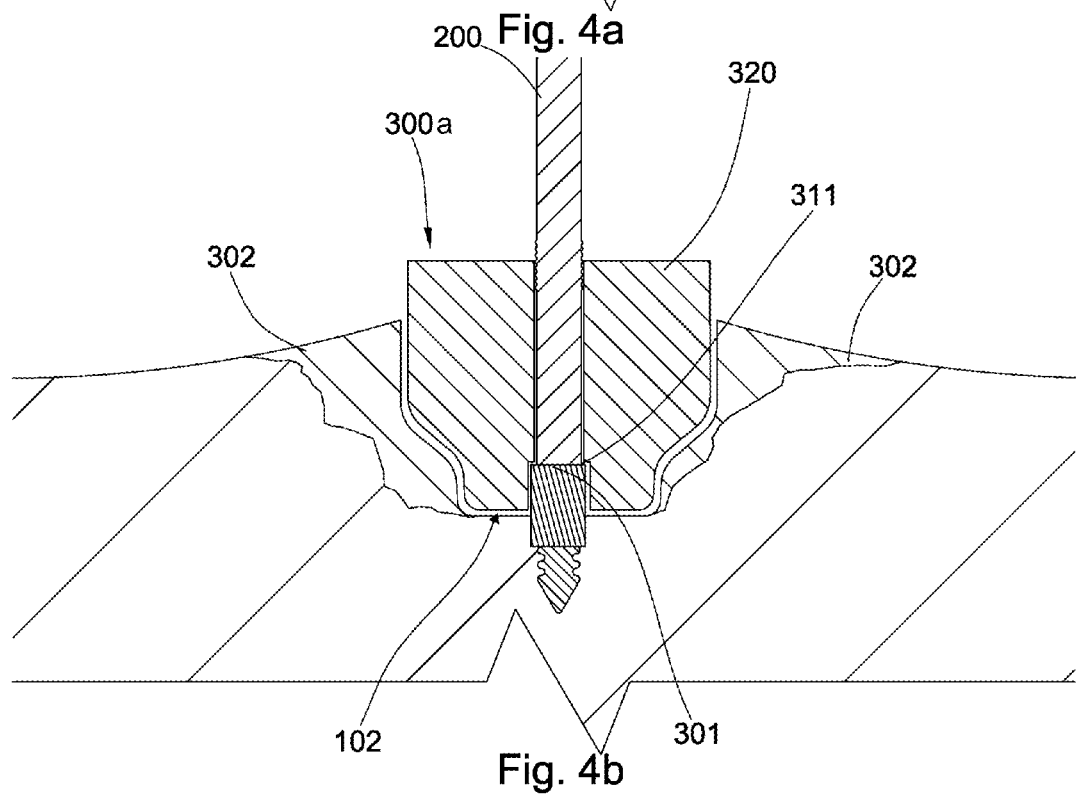
FIG. 4b is a cross-sectional diagram of the embodiment of a hollow bit on the tool attachment within the pocket in the surface of FIG. 4a and the weld material deposited within the pocket forming an interior of the pocket.

FIGS. 4a and 4b show a hollow bit 300a slidably and rotatably sitting on the tool attachment 200. The tool attachment 200 may provide for the hollow bit 300 to be centered within the pocket 102 and held in place.

The hollow bit 300a may comprise a block 320. The block 320 may comprise a material that is non-wettable with weld material 302. The block 320 may have this non-wettable material on an exterior surface or comprise a solid mass of non-wettable material. The non-wettable material may comprise graphite, pyrophyllite, certain ceramics, or combinations thereof.

The tool attachment 200 may comprise a stopping rim 301 and the hollow bit 300a may comprise an internal recess 311 such that the hollow bit 300a may slide along the tool attachment 200 until it reaches the stopping rim 301. The stopping rim 301 may place the hollow bit 300a substantially in the center of the pocket 102 and countersunk under the surface 100 to a specified depth.

With the hollow bit 300 in the pocket 102, weld 302 may be inserted intermediate or between the pocket 102 and the block 320. The weld 302 may be inserted by a welder 340. In the embodiment shown in FIG. 4a the welder 340 is in the form of a MIG welder, however, the welder 340 may also comprise a TIG, stick, or other type of welder known in the art. As shown in FIG. 4b, the weld 302 may conform to the shape of the block 320 such that a replacement cutting element may be fit within the restored pocket 102.

FIG. 5a displays an embodiment of a hollow bit 300a comprising a roughing router 420a. The roughing router 420a may comprise a cutting surface 405a comprising at least one cutting blade 410a. The hollow bit 300a may also comprise a top end 555a formed to mate with a driver 400a. The mating between the hollow bit 300a and the driver 400a may allow the driver 400a to rotate the hollow bit 300a. In some embodiments, the driver 400a may comprise a component 415a that may be a hand drill, CNC machine, drill press or combinations thereof.

FIG. 5b shows the roughing router 420a placed over the tool attachment 200 and being rotated by a driver 400a. The driver 400a may rotate the roughing router 420a causing the cutting surface 405a to cut a shape within the pocket 102 substantially similar to a cutting element.

In some embodiments, an internal threadform 430 on the roughing router 420a may interact with an external threadform 435 on the tool attachment 200. The interaction between the internal threadform 430 and the external threadform 435 may drive the roughing router 420a toward the pocket 102 and rough the weld 302. As the roughing router 420a continues to rotate the threadforms 430 and 435 may disengage. After the threadforms 430 and 435 disengage, the roughing router 420a may freely rotate about the tool attachment 200, still roughing the weld 302, but not translating further into the pocket 102.

FIG. 6 shows the now restored pocket 102 in the surface 100b. Upon completing a finishing operation on the weld 302, the hollow bits and tool attachment may be removed from the pocket 102. The anchor 201 may again be filled with a filler 203 to keep braze, loose material or other debris from entering the anchor 201. The filler 203 may comprise graphite. The filler 203 may be packed into the cavity of the anchor 201 but may also be easily removed when necessary. A replacement cutting element 101c may then be inserted into the restored pocket 102.

FIGS. 7a and 7b depict various embodiments of hollow bits 300b and 300c and drivers 400b and 400c, respectively. The hollow bit 300b may comprise a top end 555b formed to mate with the driver 400b in the embodiment shown in FIG. 7a. The top end 555b of the hollow bit 300b comprises an internal geometry 556 and the driver 400b comprises an external geometry 545, wherein the internal geometry 556 substantially mates with the external geometry 545. The internal geometry 556 may comprise the shape of a slot, cross, square, hexagon, or other geometry.

The hollow bit 300b may also comprise a finishing router 720 as shown in FIG. 7a. The finishing router 720 may comprise an abrasive surface 705. The abrasive surface 705 may comprise an abrasive material such as sandpaper, diamond grit, or other abrasive materials known in the art. The finishing router 720 may also comprise a solid abrasive form such as a grinding stone.

FIG. 7b shows an embodiment wherein the top end 555c of the hollow bit 300c comprises an external geometry 557 and the driver 400c comprises an internal geometry 546, wherein the external geometry 557 substantially mates with the internal geometry 546. The driver 400c in this embodiment may comprise a hollow tube. The internal geometry 546 may comprise the shape of a square, hexagon, octagon, star, or other geometry.

The embodiment of the hollow bit 300c as shown in FIG. 7b comprises a roughing router 420b. As mentioned previously, a roughing router 420b may comprise a cutting surface 405b comprising at least one cutting blade 410b.

Figure 8:
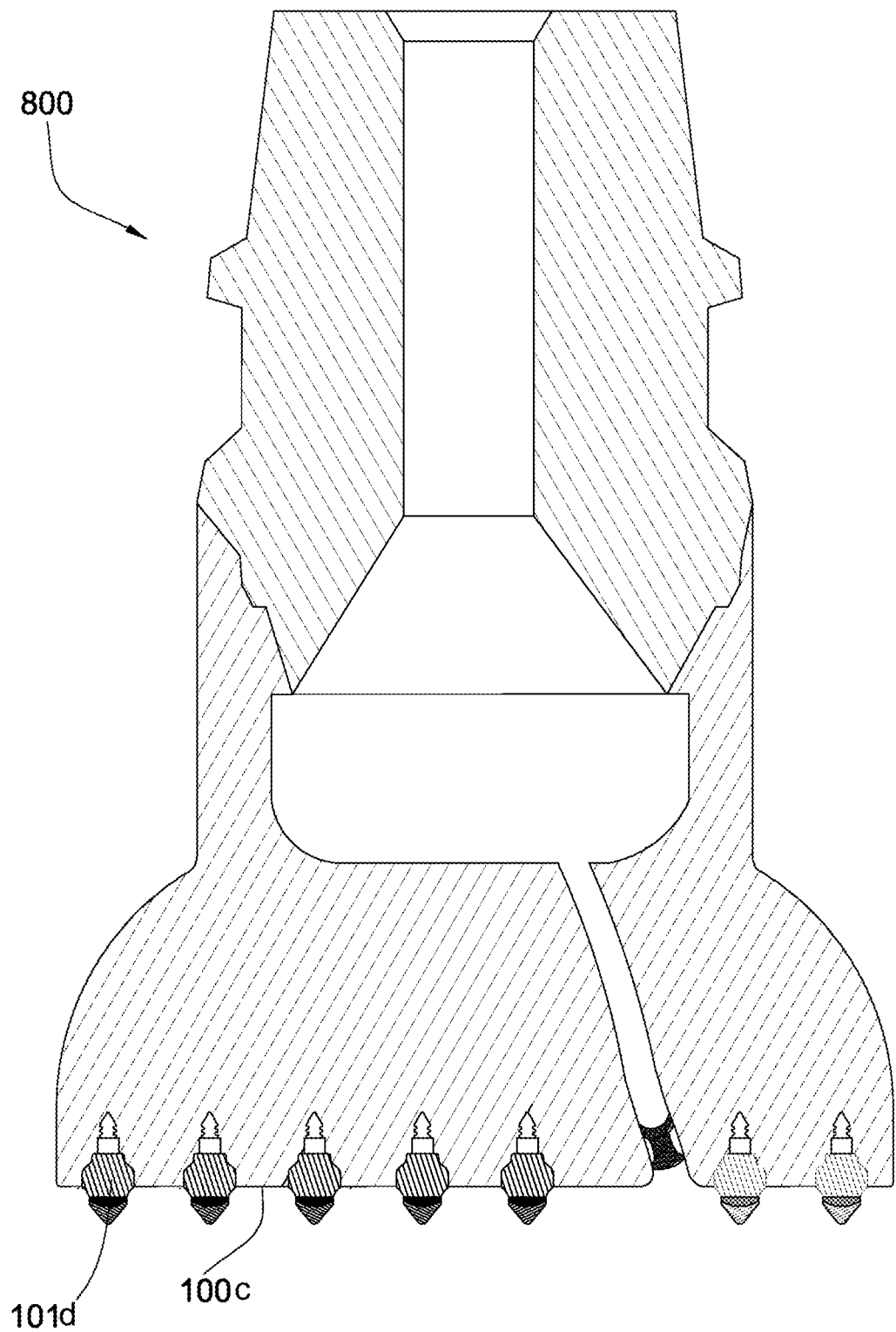
FIG. 8 is a cross-sectional diagram of an embodiment of a cutting element incorporated into a percussion drill bit.

Referring now to FIGS. 8 through 11, the cutting element may be inserted into pockets in various applications and the present invention may be used to restore those pockets. FIG. 8 shows an embodiment of a cutting element 101d incorporated into a percussion drill bit 800. The percussion drill bit 800 may comprise a surface 100c that includes at least one cutting element 101d that may be thrust into an earthen formation.

Figure 9:
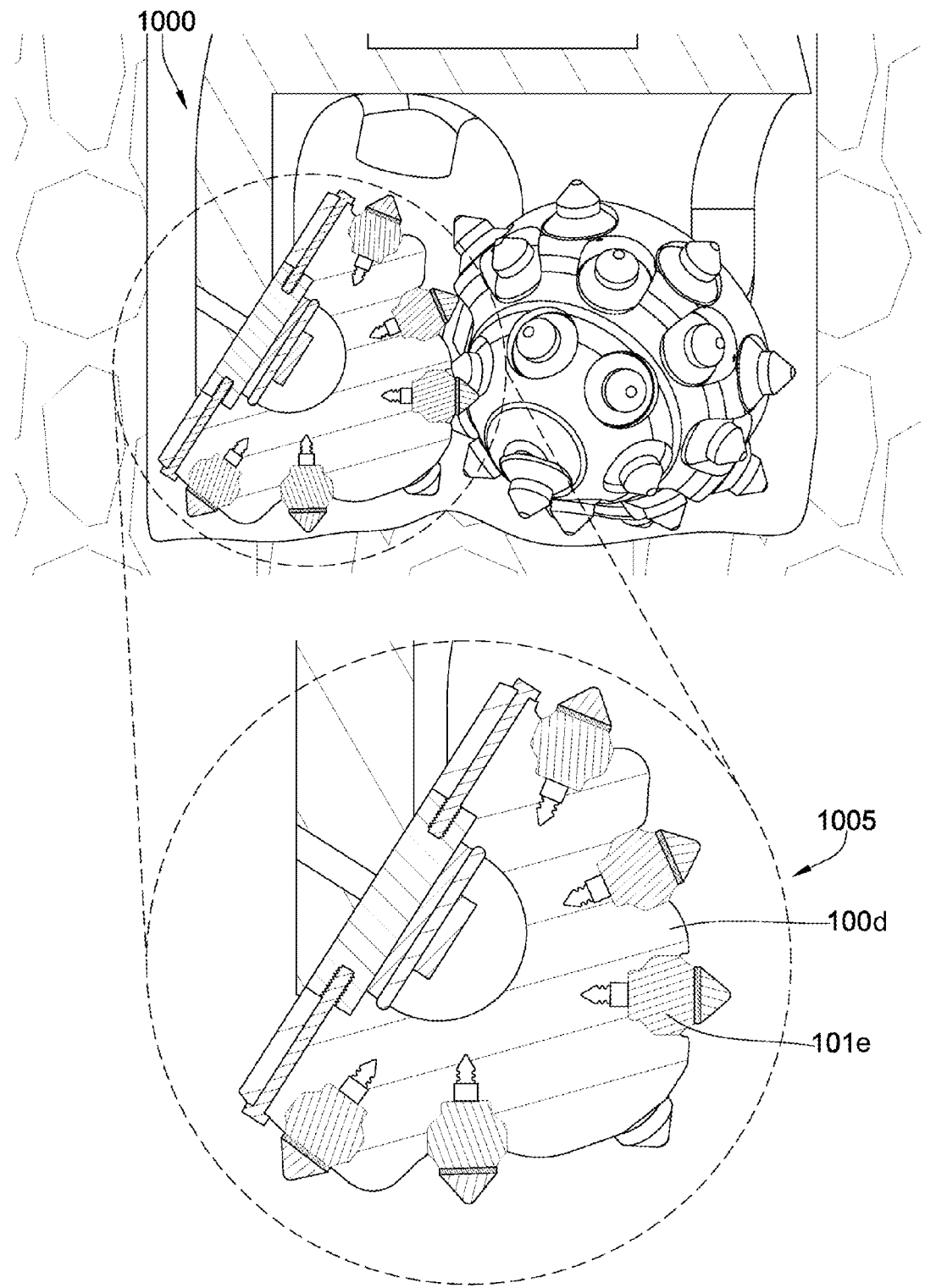
FIG. 9 is a cross-sectional diagram and a close-up view of an embodiment of a cutting element incorporated into a roller cone bit.

FIG. 9 shows an embodiment of a roller cone bit 1000. The roller cone bit 1000 may comprise at least one roller 1005. The roller 1005 may rotate while being forced into an earthen formation and thus wearing away at the formation. The roller 1005 may comprise a surface 100d comprising at least one cutting element 101e.

Figure 10:
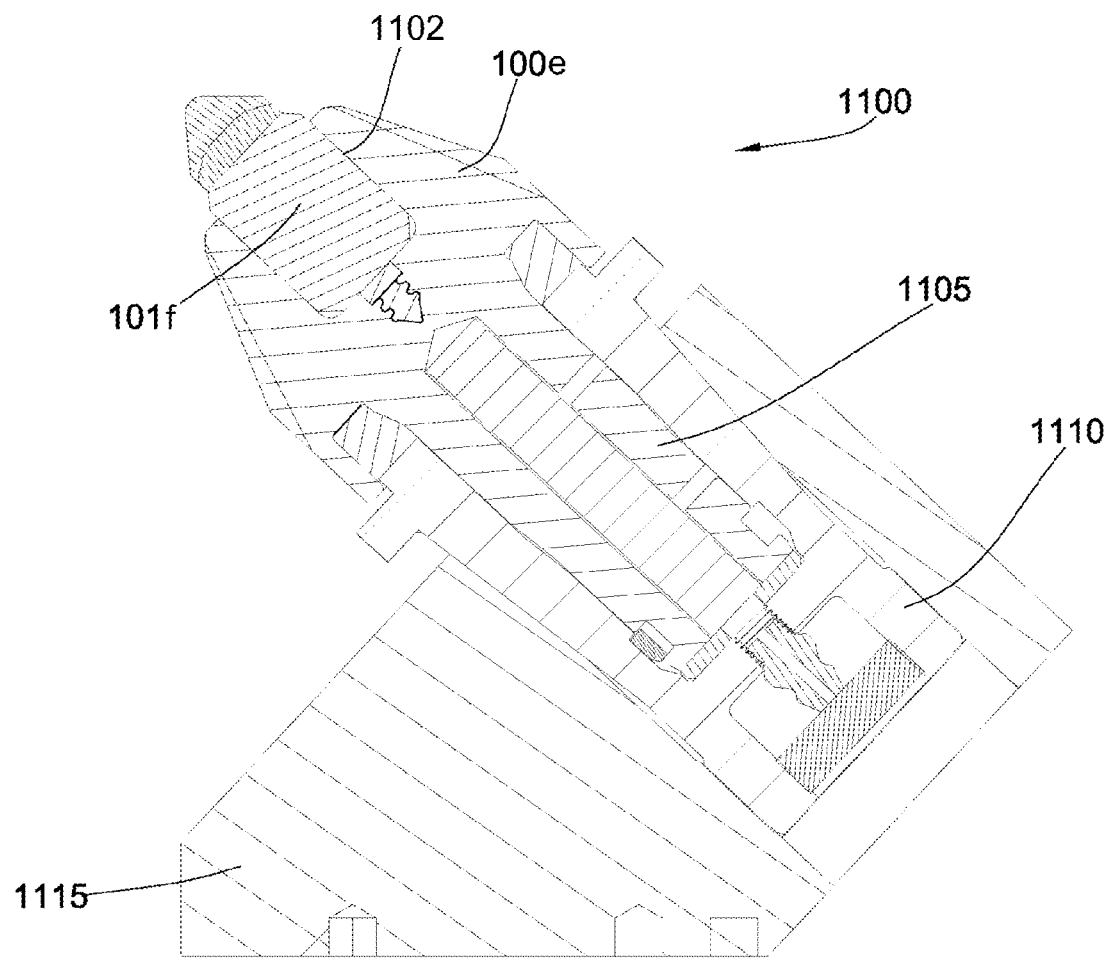
FIG. 10 is a cross-sectional diagram of an embodiment of a cutting element incorporated into a pick.

FIG. 10 shows an embodiment of a pick 1100. The pick 1100 may comprise a shank 1105 secured in a holder 1110. The holder 1110 may further be held in a block 1115 attached to a driving mechanism (not shown) that may thrust the pick into an earthen or manmade formation to degrade that formation. The shank 1105 may comprise a surface 100e on its distal end comprising a pocket 1102 and a cutting element 101f disposed within the pocket 1102.

FIG. 11 shows a flow diagram of an embodiment of a method 1200 for restoring a pocket. The method 1200 comprises the steps of providing a pocket formed in a surface and an anchor seated in the pocket 1201; connecting an end of a tool attachment comprising a cylindrical shaft to the anchor 1202; sliding a hollow bit along the cylindrical shaft of the tool attachment 1203; and shaping the pocket around an external surface of the hollow bit 1204.

Whereas the present invention has been described in particular relation to the drawings attached hereto, it should be understood that other and further modifications apart from those shown or suggested herein, may be made within the scope and spirit of the present invention.

What is claimed is:

1. A pocket restitution assembly, comprising:
a pocket formed in a surface, said pocket having an interior shaped to accept a cutting element, said pocket including:
   a central axis;
   an anchor disposed within said pocket, said anchor having an axis coaxial with said central axis; and,
   a weld material deposited within said pocket and filling a space to restore said pocket,
   wherein said weld material forms said interior.

2. The pocket restitution assembly of claim 1, further comprising:
a tool attachment comprising a shaft and an end connected to said anchor; and
a hollow bit rotatably surrounding a portion of said tool attachment and disposed within a portion of said pocket.

3. The pocket restitution assembly of claim 1, wherein said surface comprises a surface of a drill bit.

4. The pocket restitution assembly of claim 2, wherein said shaft is cylindrical and includes an external threadform and wherein said hollow bit includes an internal threadform configured to mate with said external threadform.

5. The pocket restitution assembly of claim 4, wherein said external threadform of said shaft terminates before said end.

6. The pocket restitution assembly of claim 2, wherein said hollow bit further comprises an end formed to connect with a driver.

7. The pocket restitution assembly of claim 6, further comprising at least one of a hand drill, a CNC machine, and a drill press configured to rotate said driver.

8. The pocket restitution assembly of claim 2, wherein said end of said tool attachment comprises a threaded connection.

9. The pocket restitution assembly of claim 2, wherein the shaft of said tool attachment further comprises a stopping rim proximate said end and said hollow bit comprises an internal recess configured to interact with said stopping rim.

10. The pocket restitution assembly of claim 2, wherein said hollow bit further comprises an external geometry substantially the same shape as said cutting element and wherein said weld material deposited in said pocket is deposited around said external geometry.

11. The pocket restitution assembly of claim 2, wherein said hollow bit further comprises a roughing router that includes a cutting surface.

12. The pocket restitution assembly of claim 2, wherein said hollow bit comprises a finishing router that includes an abrasive material.

13. The pocket restitution assembly of claim 1, wherein said anchor includes a filler disposed therein.

14. An assembly for repairing a degradation assembly, comprising:
a pocket formed in a surface of said degradation assembly, said pocket including:
   a central axis; and
   an anchor disposed within said pocket, said anchor having an axis coaxial with said central axis;
a tool attachment that includes a shaft and an end for connection to said anchor,
   wherein said end of said tool attachment is coupled to said anchor;
a bit surrounding a portion of said tool attachment and disposed within a portion of said pocket; and a weld material disposed within said pocket and around said bit, said weld material forming an interior of said pocket, said interior shaped to accept a cutting element.

15. The assembly of claim 14, wherein said bit further comprises an external geometry substantially the same shape as the cutting element.

16. An assembly for repairing a degradation assembly, comprising:
a pocket formed in a surface of said degradation assembly, said pocket including:
    a central axis; and
    an anchor disposed within said pocket, said anchor having an axis coaxial with said central axis;
a tool attachment that includes a shaft and an end for connection to said anchor,
    wherein said end of said tool attachment is coupled to said anchor;
a bit surrounding a portion of said tool attachment and disposed within a portion of said pocket; and
a weld material disposed within said pocket and around said bit and wherein said bit further comprises an end formed to connect with a driver.

17. The assembly of claim 16, further comprising at least one of a hand drill, a CNC machine, and a drill press configured to rotate said driver.

18. The assembly of claim 17, wherein said bit further comprises at least one of a roughing router that includes a cutting surface and a finishing router that includes an abrasive material.

\* \* \* \* \*

UNITED STATES PATENT AND TRADEMARK OFFICE
CERTIFICATE OF CORRECTION

PATENT NO.        : 8,701,799 B2                                          Page 1 of 1
APPLICATION NO.   : 12/432109
DATED             : April 22, 2014
INVENTOR(S)       : David R. Hall et al.

It is certified that error appears in the above-identified patent and that said Letters Patent is hereby corrected as shown below:

- On the Title Page, Item 56, Column 2, Page 3, line 55, the reference number cited "5,186,592" should read -- 5,186,892 --.

Signed and Sealed this
Nineteenth Day of August, 2014

Michelle K. Lee
*Deputy Director of the United States Patent and Trademark Office*